United States Patent
Zhou

(10) Patent No.: US 12,010,715 B2
(45) Date of Patent: Jun. 11, 2024

(54) METHOD AND APPARATUS FOR COORDINATING INTERFERENCE, BASE STATION AND USER EQUIPMENT

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 156 days.

(21) Appl. No.: 16/628,662

(22) PCT Filed: Jul. 7, 2017

(86) PCT No.: PCT/CN2017/092180
§ 371 (c)(1),
(2) Date: Jan. 4, 2020

(87) PCT Pub. No.: WO2019/006737
PCT Pub. Date: Jan. 10, 2019

(65) Prior Publication Data
US 2020/0154442 A1    May 14, 2020

(51) Int. Cl.
  *H04W 72/541* (2023.01)
  *H04L 5/00* (2006.01)
  *H04W 72/20* (2023.01)

(52) U.S. Cl.
  CPC ......... *H04W 72/541* (2023.01); *H04L 5/0048* (2013.01); *H04W 72/20* (2023.01)

(58) Field of Classification Search
  None
  See application file for complete search history.

(56) References Cited

U.S. PATENT DOCUMENTS

2012/0207040 A1   8/2012  Comsa et al.
2012/0327869 A1   12/2012 Wang et al.
(Continued)

FOREIGN PATENT DOCUMENTS

CN   102143521 A   8/2011
CN   102595465 A   7/2012
(Continued)

OTHER PUBLICATIONS

European Patent Office, Extended European Search Report Issued in Application No. 17916606.1, May 29, 2020 Germany, 7 pages.
(Continued)

*Primary Examiner* — Adnan Baig
(74) *Attorney, Agent, or Firm* — Syncoda LLC; Feng Ma

(57) ABSTRACT

A method of coordinating interference includes: it is determined whether in-device interference exists between uplink and downlink transmissions, by UE, in two frequency bands; and when the in-device interference exists between the uplink and downlink transmissions, by the UE, in the two frequency bands, configuration information is sent to the UE, where the configuration information instructs the UE to, in a time interval during which a base station sends control data of the downlink transmission in one of the two frequency bands, stop the uplink transmission in at least one of the two frequency bands or perform power back-off for the uplink transmission in the at least one of the two frequency bands.

15 Claims, 11 Drawing Sheets

---

Determine whether in-device interference exists between uplink and downlink transmissions, by UE, in two frequency bands — S101

When it is determined that the in-device interference exists between the uplink and downlink transmissions in the two frequency bands by the UE, send configuration information to the UE, where the configuration information is used to instruct the UE to, in a time interval during which a base station sends control data of the downlink transmission in one of the two frequency bands, stop the uplink transmission in at least one of the two frequency bands or perform power back-off for the uplink transmission in the at least one of the two frequency bands — S102

(56) References Cited

U.S. PATENT DOCUMENTS

| | | | |
|---|---|---|---|
| 2013/0064111 A1 | 3/2013 | Linsky et al. | |
| 2013/0114583 A1* | 5/2013 | Park | H04W 52/0216 370/338 |
| 2013/0194938 A1* | 8/2013 | Immonen | H04W 76/34 370/252 |
| 2013/0208641 A1 | 8/2013 | Baghel et al. | |
| 2013/0288742 A1 | 10/2013 | Yao et al. | |
| 2013/0322260 A1 | 12/2013 | Yao et al. | |
| 2014/0056276 A1* | 2/2014 | Behnamfar | H04W 72/1215 370/330 |
| 2017/0105221 A1* | 4/2017 | Ahluwalia | H04W 72/1215 |
| 2019/0174567 A1* | 6/2019 | Kusashima | H04L 5/0053 |
| 2020/0112853 A1* | 4/2020 | Jiang | H04L 5/14 |
| 2020/0128553 A1* | 4/2020 | Yang | H04L 5/0005 |

FOREIGN PATENT DOCUMENTS

| | | | |
|---|---|---|---|
| CN | 102595543 A | 7/2012 | |
| CN | 102724671 A | 10/2012 | |
| CN | 103348753 A | 10/2013 | |
| CN | 107466486 A | 12/2017 | |
| WO | 2013170210 A2 | 11/2013 | |

OTHER PUBLICATIONS

ISA State Intellectual Property Office of the People's Republic of China, Written Opinion of the International Searching Authority Issued in Application No. PCT/CN2017/092180, Mar. 27, 2018, WIPO, 9 pages.

ISA State Intellectual Property Office of the People's Republic of China, International Search Report Issued in Application No. PCT/CN2017/092180, Mar. 27, 2018, WIPO, 5 pages.

Intel Corporation (UK) Ltd "TDM Solutions for In-Device Coexistence", 3GPP TSG-RAN WG2 #71bis, R2-105666, Oct. 15, 2010, 4 pages.

State Intellectual Property Office of the People's Republic of China, Office Action and Search Report Issued in Application No. 201780000724.8, Aug. 25, 2020, 21 pages, (Submitted with Machine Translation).

State Intellectual Property Office of the People's Republic of China, Office Action and Search Report Issued in Application No. 2017800007248, Mar. 19, 2021, 24 pages, (Submitted with Machine Translation).

Indian Patent Office, Office Action Issued in Application No. 202047003956, Mar. 10, 2021, 5 pages.

Indian Patent Office, Hearing Notice Issued in Application No. 202047003956, Apr. 6, 2022, 2 pages.

* cited by examiner

METHOD AND APPARATUS FOR COORDINATING INTERFERENCE, BASE STATION AND USER EQUIPMENT

CROSS-REFERENCE TO RELATED APPLICATION

This application is a national stage of International Application No. PCT/CN2017/092180 filed on Jul. 7, 2017, the disclosure of which is hereby incorporated by reference in its entirety.

TECHNICAL FIELD

The present disclosure relates to the field of communication technology, and in particular, to a method and an apparatus for coordinating interference, a base station, user equipment, and a computer-readable storage medium.

BACKGROUND

With rapid development of wireless communication technology, a $5^{th}$-generation (5G) mobile communication technology has emerged. In the early stage of 5G layout, non-standalone (NSA) is employed for network deployment. That is, Long Term Evolution (LTE) is employed as the main coverage, new radio (NR) is employed as a powerful supplement to data transmission services, to form an LTE-NR interworking layout. In this way, it not only can take full advantage of the existing network coverage of LTE, but also can gradually transit to 5G NR, so that the network transition is smoother and more stable.

At present, popular network frequencies for NR are 3.4 GHz-4.2 GHz, 4.99 GHz, 24 GHz, and so on. Among them, 3.4 GHz in the low frequency band receives particularly more attention, and many operators will preferentially deploy 5G NR with 3.4 GHz-3.6 GHz frequency.

However, LTE has a large number of devices working in the 1.7 GHz-1.8 GHz frequency range, such as the common Frequency Division Dual (FDD) band 3, and so on.

User equipment (UE) can work in one frequency band of LTE and one frequency band of NR at the same time, and can also work in two frequency bands for NR. When interworking in two frequency bands, there may be problems of mutual interference between uplink and downlink transmissions in the two frequency bands. At present, the problem of mutual interference is solved by avoiding concurrency of the two frequency bands, that is, either activating one frequency band or activating another frequency band. However, this method requires to frequently activate different frequency bands, which wastes UE resources and affects user experience.

SUMMARY

In view of the above, the present application discloses a method and an apparatus for coordinating interference, a base station, user equipment, and a computer-readable storage medium, to reduce the problem of interference between uplink and downlink transmissions in the two frequency bands within the user equipment to a control channel.

According to a first aspect of the examples of the present disclosure, a method of coordinating interference is provided, and the method includes:

determining whether in-device interference exists between uplink and downlink transmissions, by UE, in two frequency bands; and when the in-device interference exists between the uplink and downlink transmissions in the two frequency bands by the UE, sending configuration information to the UE, where the configuration information is used to instruct the UE to, in a time interval during which a base station sends control data of the downlink transmission in one of the two frequency bands, stop the uplink transmission in at least one of the two frequency bands or perform power back-off for the uplink transmission in the at least one of the two frequency bands.

In an example, when the in-device interference exists between the uplink and downlink transmissions in the two frequency bands by the UE, sending the configuration information to the UE, where the configuration information is used to instruct the UE to, in the time interval during which the base station sends the control data of the downlink transmission in one of the two frequency bands, stop the uplink transmission in the at least one of the two frequency bands or perform power back-off for the uplink transmission in the at least one of the two frequency bands, includes:

when it is determined that harmonic interference exists between the uplink transmission in a first frequency band and the downlink transmission in a second frequency band by the UE, determining a first time interval during which the control data of the downlink transmission in the second frequency band is to be sent, and sending first configuration information to the UE, where the first configuration information is used to instruct the UE to, in the first time interval, stop the uplink transmission in the first frequency band or send the uplink transmission in the first frequency band at a reduced transmission power.

In an example, when the in-device interference exists between the uplink and downlink transmissions in the two frequency bands by the UE, sending the configuration information to the UE, where the configuration information is used to instruct the UE to, in the time interval during which the base station sends the control data of the downlink transmission in one of the two frequency bands, stop the uplink transmission in the at least one of the two frequency bands or perform power back-off for the uplink transmission in the at least one of the two frequency bands, includes:

when it is determined that intermodulation interference exists between the uplink transmission in both a first frequency band and a second frequency band and the downlink transmission in the first frequency band by the UE, determining a second time interval during which the control data of the downlink transmission in the first frequency band is to be sent, and sending second configuration information and third configuration information to the UE, where the second configuration information is used to instruct the UE to, in the second time interval, stop the uplink transmission in the first frequency band or send the uplink transmission in the first frequency band at a reduced transmission power, and the third configuration information is used to instruct the UE to, in the second time interval, stop the uplink transmission in the second frequency band or send the uplink transmission in the second frequency band at the reduced transmission power.

In an example, the control data includes control signaling and a reference signal, or the control data includes the control signaling.

In an example, when the control data includes the control signaling only, the first configuration information includes a first interference coordination policy, and the first interference coordination policy includes: that the UE delays sending the uplink transmission in the first frequency band for a length of the first time interval, or a first set power value by which a transmission power is to be reduced; and when the control data includes the control signaling only, each of the second configuration information and the third configuration information includes a second interference coordination policy, and the second interference coordination policy includes: that the UE delays sending the uplink transmission in both the first frequency band and the second frequency band for a length of the second time interval, or a second set power value by which a transmission power is to be reduced.

In an example, the method further includes:

prior to determining whether the in-device interference exists between the uplink and downlink transmissions, by the UE, in the two frequency bands, receiving interference tolerance capability information reported by the UE, where determining whether the in-device interference exists between the uplink and downlink transmissions, by the UE, in the two frequency bands includes:

determining whether the in-device interference exists between the uplink and downlink transmissions, by the UE, in the two frequency bands according to the interference tolerance capability information and information on the UE accessing a network.

In an example, the first frequency band belongs to a frequency band for LTE, and the second frequency band belongs to a frequency band for NR; or the first frequency band and the second frequency band belong to two frequency bands for the NR, respectively.

In an example, the first configuration information, the second configuration information, or the third configuration information is carried in broadcast signaling, upper layer signaling, or physical layer control signaling sent by the base station.

According to a second aspect of the examples of the present disclosure, a method of coordinating interference is provided, and the method includes:

receiving configuration information, which is sent by a base station upon determining that in-device interference exists between uplink and downlink transmissions, by UE, in two frequency bands; and according to the configuration information, in a time interval during which the base station sends control data of the downlink transmission in one of the two frequency bands, stopping the uplink transmission in at least one of the two frequency bands or performing power back-off for the uplink transmission in the at least one of the two frequency bands.

In an example, receiving configuration information sent by the base station includes:

receiving first configuration information, which is sent by the base station upon determining that harmonic interference exists between the uplink transmission in a first frequency band and the downlink transmission in a second frequency band by the UE and determining a first time interval during which the control data of the downlink transmission in the second frequency band is to be sent; and according to the configuration information, in the time interval during which the base station sends the control data of the downlink transmission in one of the two frequency bands, stopping the uplink transmission in the at least one of the two frequency bands, or performing power back-off for the uplink transmission in the at least one of the two frequency bands includes:

according to the first configuration information, in the first time interval, stopping the uplink transmission in the first frequency band or sending the uplink transmission in the first frequency band at a reduced transmission power.

In an example, receiving configuration information sent by the base station includes:

receiving second configuration information and third configuration information, which are sent by the base station upon determining that intermodulation interference exists between the uplink transmission in both a first frequency band and a second frequency band and the downlink transmission in the first frequency band by the UE and determining a second time interval during which the control data of the downlink transmission in the first frequency band is to be sent; and according to the configuration information, in the time interval during which the base station sends the control data of the downlink transmission in one of the two frequency bands, stopping the uplink transmission in the at least one of the two frequency bands, or performing power back-off for the uplink transmission in the at least one of the two frequency bands includes:

according to the second configuration information and the third configuration information, in the second time interval, stopping the uplink transmission in both the first frequency band and the second frequency band or sending the uplink transmission in both the first frequency band and the second frequency band at a reduced transmission power.

In an example, the control data includes control signaling and a reference signal, or the control data includes the control signaling.

In an example, when the control data includes the control signaling only, the first configuration information includes a first interference coordination policy, and the first interference coordination policy includes: that the UE delays sending the uplink transmission in the first frequency band for a length of the first time interval, or a first set power value by which a transmission power is to be reduced; and when the control data includes the control signaling only, each of the second configuration information and the third configuration information includes a second interference coordination policy, and the second interference coordination policy includes: that the UE delays sending the uplink transmission in both the first frequency band and the second frequency band for a length of the second time interval, or a second set power value by which a transmission power is to be reduced.

In an example, according to the first configuration information, in the first time interval, stopping the uplink transmission in the first frequency band include:

according to the first interference coordination policy, delaying sending the uplink transmission in the first frequency band for at least the length of the first time interval; or sending the uplink transmission in the first frequency band at the reduced transmission power includes:

sending the uplink transmission in the first frequency band at a transmission power reduced by the first set power value.

In an example, according to the second configuration information and the third configuration information, in the second time interval, stopping the uplink transmission in both the first frequency band and the second frequency band includes:

according to the second interference coordination policy, delaying sending the uplink transmission in both the first frequency band and the second frequency band for at least the length of the second time interval; or sending the uplink transmission in both the first frequency band and the second frequency band at the reduced transmission power includes:

sending the uplink transmission in both the first frequency band and the second frequency band at a transmission power reduced by the second set power value.

In an example, the method further includes:

prior to receiving the configuration information sent by the base station, reporting interference tolerance capability information of the UE to the base station, so that the base station determines whether the in-device interference exists between the uplink and downlink transmissions in the two frequency bands according to the interference tolerance capability information and information on the UE accessing a network.

In an example, the first frequency band belongs to a frequency band for LTE, and the second frequency band belongs to a frequency band for NR; or the first frequency band and the second frequency band belong to two frequency bands for the NR, respectively.

In an example, the first configuration information, the second configuration information, or the third configuration information is carried in broadcast signaling, upper layer signaling, or physical layer control signaling sent by the base station.

According to a third aspect of the examples of the present disclosure, an apparatus for coordinating interference is provided, and the apparatus includes:

a determining module configured to determine whether in-device interference exists between uplink and downlink transmissions, by UE, in two frequency bands; and a coordinating module configured to, when the determining module determines that the in-device interference exists between the uplink and downlink transmissions in the two frequency bands by the UE, send configuration information to the UE, where the configuration information is used to instruct the UE to, in a time interval during which a base station sends control data of the downlink transmission in one of the two frequency bands, stop the uplink transmission in at least one of the two frequency bands or perform power back-off for the uplink transmission in the at least one of the two frequency bands.

In an example, the coordinating module is configured to, when it is determined that harmonic interference exists between the uplink transmission in a first frequency band and the downlink transmission in a second frequency band by the UE, determine a first time interval during which the control data of the downlink transmission in the second frequency band is to be sent, and send first configuration information to the UE, where the first configuration information is used to instruct the UE to, in the first time interval, stop the uplink transmission in the first frequency band or to send the uplink transmission in the first frequency band at a reduced transmission power.

In an example, the coordinating module is configured to, when it is determined that intermodulation interference exists between the uplink transmission in both a first frequency band and a second frequency band and the downlink transmission in the first frequency band by the UE, determine a second time interval during which the control data of the downlink transmission in the first frequency band is to be sent, and send second configuration information and third configuration information to the UE, where the second configuration information is used to instruct the UE to, in the second time interval, stop the uplink transmission in the first frequency band or send the uplink transmission in the first frequency band at a reduced transmission power, and the third configuration information is used to instruct the UE to, in the second time interval, stop the uplink transmission in the second frequency band or send the uplink transmission in the second frequency band at the reduced transmission power.

In an example, the control data includes control signaling and a reference signal, or the control data includes the control signaling.

In an example, when the control data includes the control signaling only, the first configuration information includes a first interference coordination policy, and the first interference coordination policy includes: that the UE delays sending the uplink transmission in the first frequency band for a length of the first time interval, or a first set power value by which a transmission power is to be reduced; and when the control data includes the control signaling only, each of the second configuration information and the third configuration information includes a second interference coordination policy, and the second interference coordination policy includes: that the UE delays sending the uplink transmission in both the first frequency band and the second frequency band for a length of the second time interval, or a second set power value by which a transmission power is to be reduced.

In an example, the apparatus further includes:

a receiving module configured to, before the determining module determines whether the in-device interference exists between the uplink and downlink transmissions, by the UE, in the two frequency bands, receive interference tolerance capability information reported by the UE, where the determining module is configured to determine whether the in-device interference exists between the uplink and downlink transmissions, by the UE, in the two frequency bands according to the interference tolerance capability information which is received by the receiving module and information on the UE accessing a network.

In an example, the first frequency band belongs to a frequency band for LTE, and the second frequency band belongs to a frequency band for NR; or the first frequency band and the second frequency band belong to two frequency bands for the NR, respectively.

In an example, the first configuration information, the second configuration information, or the third configuration information is carried in broadcast signaling, upper layer signaling, or physical layer control signaling sent by the base station.

According to a fourth aspect of the examples of the present disclosure, an apparatus for coordinating interference is provided, and the apparatus includes:

a receiving module configured to receive configuration information, which is sent by a base station upon determining that in-device interference exists between uplink and downlink transmissions, by UE, in two frequency bands; and a coordinating module configured to, according to the configuration information received by the receiving module, in a time interval during which the base station sends control data of the downlink transmission in one of the two frequency bands, stop the uplink transmission in at least one of the two frequency bands or perform power back-off for the uplink transmission in the at least one of the two frequency bands.

In an example, the receiving module includes:

a first receiving sub-module configured to receive first configuration information, which is sent by the base station upon determining that harmonic interference exists between the uplink transmission in a first frequency band and the downlink transmission in a second frequency band by the UE and determining a first time interval during which the control data of the downlink transmission in the second frequency band is to be sent; and the coordinating module includes:

a first coordinating sub-module configured to, according to the first configuration information received by the first receiving sub-module, in the first time interval, stop the uplink transmission in the first frequency band or send the uplink transmission in the first frequency band at a reduced transmission power.

In an example, the receiving module includes:

a second receiving sub-module configured to receive second configuration information and third configuration information, which are sent by the base station upon determining that intermodulation interference exists between the uplink transmission in both a first frequency band and a second frequency band and the downlink transmission in the first frequency band by the UE and determining a second time interval during which the control data of the downlink transmission in the first frequency band is to be sent; and the coordinating module includes:

a second coordinating sub-module configured to, according to the second configuration information and the third configuration information received by the second receiving sub-module, in the second time interval, stop the uplink transmission in both the first frequency band and the second frequency band or send the uplink transmission in both the first frequency band and the second frequency band at a reduced transmission power.

In an example, the control data includes control signaling and a reference signal, or the control data includes the control signaling.

In an example, when the control data includes the control signaling only, the first configuration information includes a first interference coordination policy, and the first interference coordination policy includes: that the UE delays sending the uplink transmission in the first frequency band for a length of the first time interval, or a first set power value by which a transmission power is to be reduced; and when the control data includes the control signaling only, each of the second configuration information and the third configuration information includes a second interference coordination policy, and the second interference coordination policy includes: that the UE delays sending the uplink transmission in both the first frequency band and the second frequency band for a length of the second time interval, or a second set power value by which a transmission power is to be reduced.

In an example, the first coordinating sub-module includes:

a first sending unit configured to, according to the first interference coordination policy, delay sending the uplink transmission in the first frequency band for at least the length of the first time interval; or a second sending unit configured to send the uplink transmission in the first frequency band at a transmission power reduced by the first set power value.

In an example, the second coordinating sub-module includes:

a third sending unit configured to, according to the second interference coordination policy, delay sending the uplink transmission in both the first frequency band and the second frequency band for at least the length of the second time interval; or a fourth sending unit configured to send the uplink transmission in both the first frequency band and the second frequency band at a transmission power reduced by the second set power value.

In an example, the apparatus further includes:

a reporting module configured to, before the receiving module receives the configuration information sent by the base station, report interference tolerance capability information of the UE to the base station, so that the base station determines whether the in-device interference exists between the uplink and downlink transmissions in the two frequency bands according to the interference tolerance capability information and information on the UE accessing a network.

In an example, the first frequency band belongs to a frequency band for LTE, and the second frequency band belongs to a frequency band for NR; or the first frequency band and the second frequency band belong to two frequency bands for the NR, respectively.

In an example, the first configuration information, the second configuration information, or the third configuration information is carried in broadcast signaling, upper layer signaling, or physical layer control signaling sent by the base station.

According to a fifth aspect of the examples of the present disclosure, a base station is provided, and the base station includes:

a processor; and a memory for storing instructions executable by the processor, where the processor is configured to:

determine whether in-device interference exists between uplink and downlink transmissions, by UE, in two frequency bands; and when the in-device interference exists between the uplink and downlink transmissions in the two frequency bands by the UE, send configuration information to the UE, where the configuration information is used to instruct the UE to, in a time interval during which the base station sends control data of the downlink transmission in one of the two frequency bands, stop the uplink transmission in at least one of the two frequency bands or perform power back-off for the uplink transmission in the at least one of the two frequency bands.

According to a sixth aspect of the examples of the present disclosure, user equipment is provided, and the user equipment includes:

a processor; and a memory for storing instructions executable by the processor, where the processor is configured to:

receive configuration information, which is sent by a base station upon determining that in-device interference exists between uplink and downlink transmissions, by the UE, in two frequency bands; and according to the configuration information, in a time interval during which the base station sends control data of the downlink transmission in one of the two frequency bands, stop the uplink transmission in at least one of the two frequency bands or perform power back-off for the uplink transmission in the at least one of the two frequency bands.

According to a seventh aspect of the examples of the present disclosure, a computer-readable storage medium storing a computer program is provided, when the program is executed by a processor, causes the processor to implement method of coordinating interference described above.

According to an eighth aspect of the examples of the present disclosure, a computer-readable storage medium storing a computer program is provided, when the program is executed by a processor, causes the processor to implement method of coordinating interference described above.

The technical solutions provided by the examples of the present disclosure may include the following beneficial effects.

When it is determined that in-device interference exists between uplink and downlink transmissions, by UE, in two frequency bands, configuration information is sent to the UE, so that the UE can, in a time interval during which the base station sends control data of downlink transmission in one of the two frequency bands, stop the uplink transmission in at least one of the two frequency bands or perform power back-off for the uplink transmission in the at least one of the two frequency bands, thereby achieving an objective of reducing interference to a control channel in the device.

When it is determined that harmonic interference exists between the uplink transmission in a first frequency band and the downlink transmission in a second frequency band by the UE, by determining the first time interval during which control data of downlink transmission in the second frequency band is to be sent, and sending the first configuration information to the UE, the UE can stop the uplink transmission in the first frequency band in the first time interval or send the uplink transmission in the first frequency band at a reduced transmission power in the first time interval, thereby achieving an objective of reducing the harmonic interference.

When it is determined that intermodulation interference exists between the uplink transmission in both the first frequency band and the second frequency band and the downlink transmission in the first frequency band by the UE, by determining the second time interval during which the control data of the downlink transmission in the first frequency band is to be sent, and sending the second configuration information and the third configuration information to the UE, according to the second configuration information and the third configuration information, the UE can stop the uplink transmission in both the first frequency band and the second frequency band in the second time interval or send the uplink transmission in both the first frequency band and the second frequency band at a reduced transmission power, thereby achieving an objective of reducing intermodulation interference.

The solution is made clearer by describing the content of the control data.

By describing the content of the first configuration information, it facilitates that the UE delays sending the uplink transmission in the first frequency band or sends the uplink transmission in the first frequency band at a reduced transmission power according to the first configuration information. By describing the content of the second configuration information and the third configuration information, it facilitates that the UE delays sending the uplink transmission in both the first frequency band and the second frequency band or sends the uplink transmission in both the first frequency band and the second frequency band at a reduced transmission power according to the second configuration information and the third configuration information.

By receiving the interference tolerance capability information reported by the UE, based on the interference tolerance capability information and the information on the UE accessing a network, it can be determined whether the harmonic interference or the intermodulation interference exists between the uplink and downlink transmissions of the two frequency bands by the UE, thereby improving an accuracy for determining interference.

The solution is made clearer by describing the two frequency bands to which the two frequency bands belong.

The solution is made clearer by describing that the first configuration information, the second configuration information, or the third configuration information is carried in broadcast signaling, upper layer signaling, or physical layer control signaling sent by the base station.

By receiving configuration information, and according to the configuration information, the UE can, in a time interval during which the base station is transmitting control data of downlink transmission in one of the two frequency bands, stop the uplink transmission in at least one of the two frequency bands or perform power back-off for the uplink transmission in the at least one of the two frequency bands, thereby achieving an objective of reducing interference to a control channel in the device.

By receiving the first configuration information sent by the base station, and according to the first configuration information, the uplink transmission in the first frequency band may be stopped in the first time interval or the uplink transmission in the first frequency band is sent at a reduced transmission power, thereby achieving the objective of reducing the harmonic interference.

By receiving the second configuration information and the third configuration information sent by the base station, and according to the second configuration information and the third configuration information, the uplink transmission in both the first frequency band and the second frequency band may be stopped or the uplink transmission in both the first frequency band and the second frequency band may be sent at a reduced transmission power in the second time interval, thereby reducing the intermodulation interference.

The scheme is made clearer by describing the content of the control data.

By describing the content of the first configuration information, it facilitates that the UE delays sending the uplink transmission in the first frequency band or sends the uplink transmission in the first frequency band at a reduced transmission power according to the first configuration information. By describing the content of the second configuration information and the third configuration information, it facilitates that the UE delays sending the uplink transmission in both the first frequency band and the second frequency band or sends the uplink transmission in both the first frequency band and the second frequency band at a reduced transmission power according to the second configuration information and the third configuration information.

By delaying sending the uplink transmission in the first frequency band for a length of the first time interval, or sending the uplink transmission in the first frequency band at a transmission power reduced by a first set power value, the harmonic interference is reduced.

By delaying sending the uplink transmission in both the first frequency band and the second frequency band for at least a length of the second time interval, or sending the uplink transmission in both the first frequency band and the second frequency band at a transmission power reduced by a second set power value, the intermodulation interference is reduced.

By reporting interference tolerance capability information from the UE to the base station, the base station can determine whether the in-device interference, such as the harmonic interference or the intermodulation interference, exists between uplink and downlink transmissions in the two frequency bands by the UE according to the interference tolerance capability information and information on the UE accessing a network, thereby improving an accuracy for determining interference.

The solution is made clearer by describing the two frequency bands to which the two frequency bands belong.

The solution is made clearer by describing that the first configuration information, the second configuration information, or the third configuration information is carried in the broadcast signaling, the upper layer signaling, or the physical layer control signaling sent by the base station.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
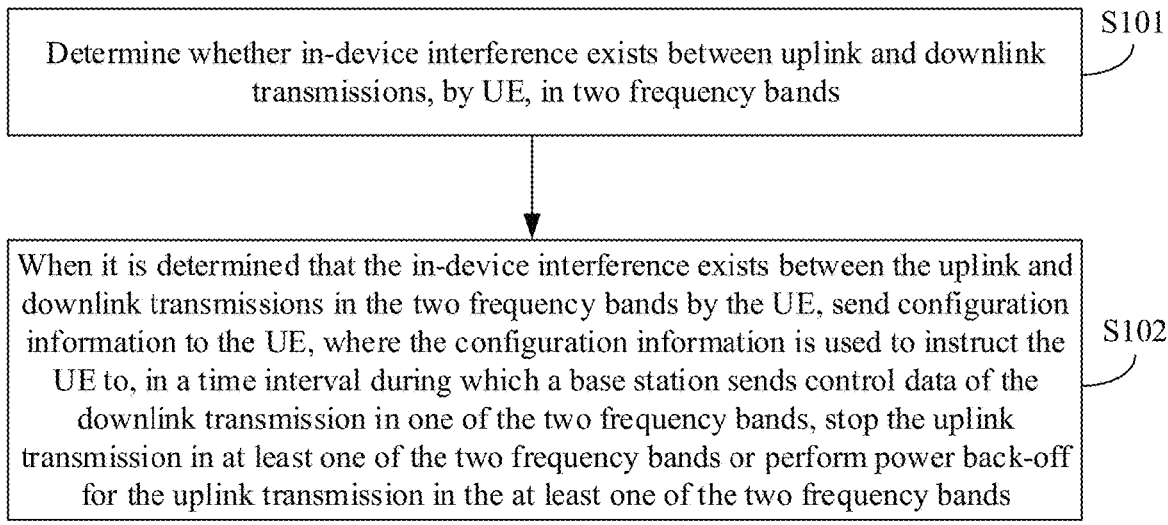
FIG. 1 is a flowchart illustrating a method of coordinating interference according to an example of the present application.

Examples will be described in detail herein, with the illustrations thereof represented in the drawings. When the following descriptions involve the drawings, like numerals in different drawings refer to like or similar elements unless otherwise indicated. The examples described in the following examples do not represent all examples consistent with the present disclosure. Rather, they are merely examples of apparatuses and methods consistent with some aspects of the present disclosure as detailed in the appended claims.

FIG. 1 is a flowchart illustrating a method of coordinating interference according to an example of the present application. This example is described from a base station side. As shown in FIG. 1, the method of coordinating interference includes steps S101-S102.

At step S101, it is determined whether in-device interference exists between uplink and downlink transmissions, by UE, in two frequency bands.

In this example, the base station may determine whether the in-device interference exists between the uplink and downlink transmissions, by the UE, in the two frequency bands according to information on the UE accessing a network, where the in-device interference may include harmonic interference and intermodulation interference.

When integer multiples of one frequency band at least partially overlap with another frequency band, harmonic interference may occur between uplink and downlink transmissions in these two frequency bands.

Intermodulation interference (IM interference) refers to that when two or more interfering signals are added to a receiver at the same time, due to a non-linear effect, the frequencies of resultant components formed by the interfering signals are sometimes equal to or close to a frequency of a desired signal, and thus the resultant components pass straight through the receiver and cause interference.

At step S102, if the in-device interference exists between the uplink and downlink transmissions in the two frequency bands by the UE, configuration information is sent to the UE, where the configuration information is used to instruct the UE, in a time interval during which the base station sends control data of a downlink transmission in one of the two frequency bands, to stop an uplink transmission in at least one of the two frequency bands or to perform power back-off for the uplink transmission in the at least one of the two frequency bands.

In this example, if the base station determines that the in-device interference, such as harmonic interference or intermodulation interference, exists between the uplink and downlink transmissions, by the UE, in the two frequency bands, the base station may send configuration information to the UE, and the UE can stop an uplink transmission in at least one of the two frequency bands in a time interval during which the base station sends control data of a downlink transmission in one of the two frequency bands according to the configuration information, thereby avoiding the interference to a control channel in the device. And the UE may also perform power back-off for an uplink transmission in at least one of the two frequency bands in a time interval during which the base station sends the control data of the downlink transmission in one of the two frequency bands according to the configuration information, thereby achieving an objective of reducing the interference to the control channel in the device.

In the example, when it is determined that the in-device interference exists between the uplink and downlink transmissions in two frequency bands by the UE, the configuration information is sent to the UE, so that the UE can stop the uplink transmission in at least one of the two frequency bands or perform power back-off for the uplink transmission in the at least one of the two frequency bands in a time interval during which the base station sends control data of the downlink transmission in one of the two frequency bands, thereby achieving the objective of reducing the interference to the control channel in the device.

Figure 2A:
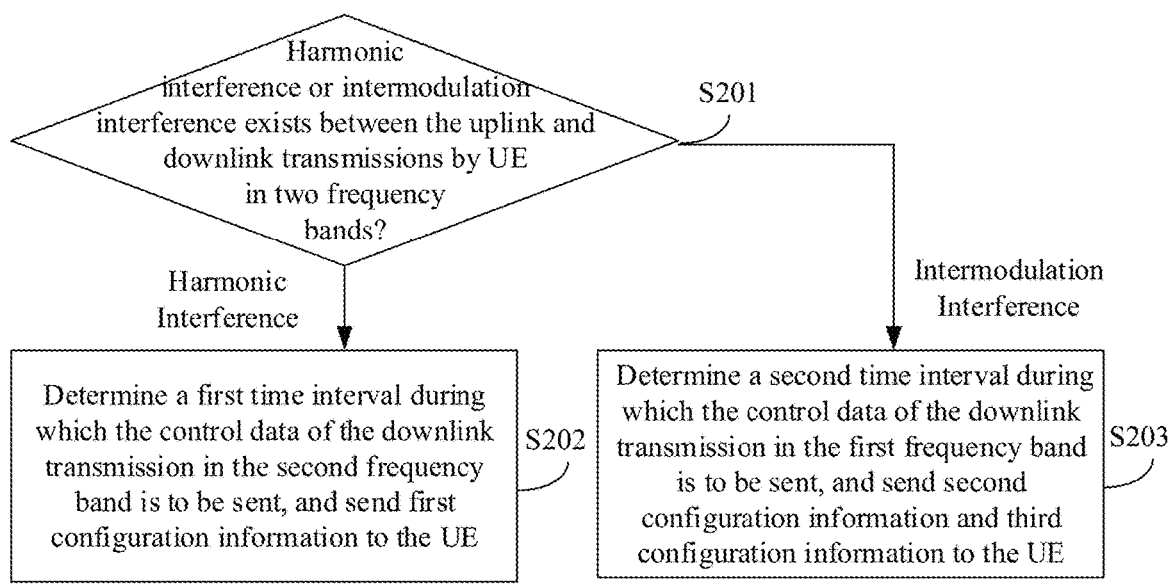
FIG. 2A is a flowchart illustrating another method of coordinating interference according to an example of the present application.

FIG. 2A is a flowchart illustrating another method of coordinating interference according to an example of the present application. This example is described from a base station side. As shown in FIG. 2A, the method of coordinating interference includes steps S201-S203.

At step S201, it is determined whether harmonic interference or intermodulation interference exists between uplink and downlink transmissions in two frequency bands by UE. If it is determined that the harmonic interference exists between an uplink transmission in a first frequency band and a downlink transmission in a second frequency band by the UE, step S202 is performed, and if it is determined that the intermodulation interference exists between uplink transmission in both a first frequency band and a second frequency band and a downlink transmission in the first frequency band by the UE, step S203 is performed.

In this example, the base station may determine whether the harmonic interference or the intermodulation interference exists between the uplink transmission and the downlink transmission, by the UE, in the two frequency bands according to the information on the UE accessing the network. In order to improve an accuracy of the decision, it is also possible to first receive interference tolerance capability information reported by the UE, and then determine whether the harmonic interference or the intermodulation interference exists between the uplink transmission and the downlink transmission, by the UE, in the two frequency bands according to the interference tolerance capability information and the information of the UE accessing the network.

The first frequency band may belong to a frequency band for LTE, and the second frequency band may belong to a frequency band for NR. Alternatively, the first frequency band and the second frequency band may also belong to two frequency bands for the NR respectively.

Figure 2B:
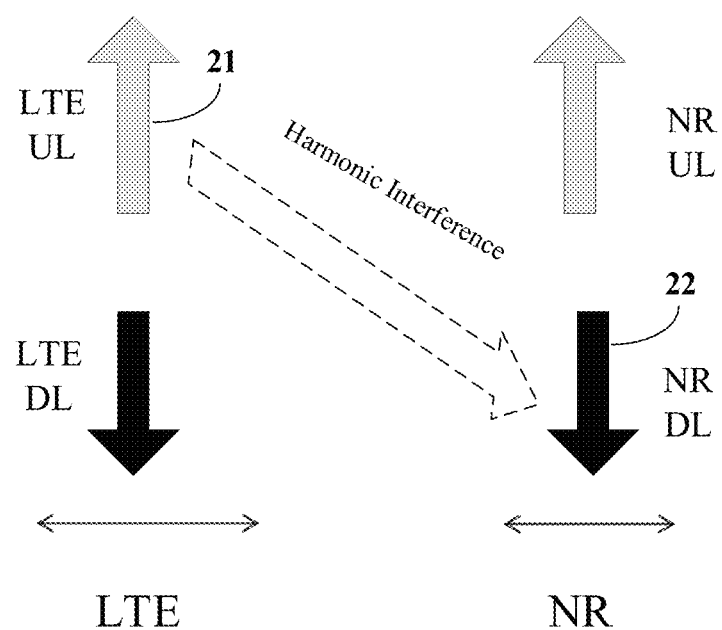
FIG. 2B is a schematic diagram illustrating two frequency bands having harmonic interference according to an example of the present application.
Figure 2C:
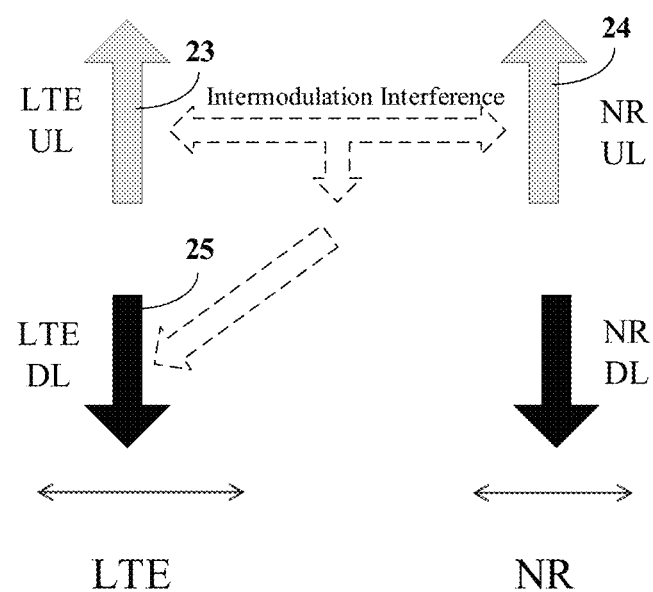
FIG. 2C is a schematic diagram illustrating two frequency bands having intermodulation interference according to an example of the present application.

Assuming that the first frequency band is an LTE frequency band and the second frequency band is an NR frequency band, as shown in FIG. 2B, harmonic waves of uplink (UL) transmission 21 in the LTE frequency band may interference downlink (DL) transmission 22 in the NR frequency band for the UE. As shown in FIG. 2C, intermodulation components formed by uplink transmission 24 in the LTE frequency band and uplink transmission 25 in the NR frequency band may interference downlink transmission 26 in the LTE frequency band for the UE.

At step S202, a first time interval for sending control data of the downlink transmission in the second frequency band is determined, and first configuration information is sent to the UE, where the first configuration information is used to instruct the UE to stop the uplink transmission in the first frequency band in the first time interval or to send the uplink transmission in the first frequency band at a reduced transmission power in the first time interval.

The control data may include control signaling and a reference signal, or may include only control signaling. The control signaling may include, but is not limited to, a physical downlink control channel (PDCCH). The first configuration information may be carried in broadcast signaling, upper layer signaling, or physical layer control signaling, sent by the base station.

In this example, after base station determines that the harmonic interference exists between the uplink transmission in the first frequency band and the downlink transmission in the second frequency band by the UE, the base station may determine a first time interval during which the control data of the downlink transmission in the second frequency band is to be sent, and send first configuration information to the UE, so that the UE can stop the uplink transmission in the first frequency band or send the uplink transmission in the first frequency band at a reduced transmission power in the first time interval.

Taking FIG. 2B as an example for description, after the base station determines that the harmonic interference exists between the uplink transmission in the LTE frequency band and the downlink transmission in the NR frequency band by the UE, the base station may determine a first time interval for sending control data of the downlink transmission in the NR frequency band, and send first configuration information to the UE. Upon receiving the first configuration information, the UE may stop the uplink transmission in the LTE frequency band in the first time interval according to the first configuration information, so as to avoid the harmonic interference. Upon receiving the first configuration information, the UE may also send the uplink transmission in the LTE frequency band at a reduced transmission power according to the configuration information, so as to reduce the harmonic interference.

In addition, when the control data includes the control signaling only, the first configuration information may include a first interference coordination policy, and the first interference coordination policy may include: that the UE delays sending the uplink transmission in the first frequency band for a length of the first time interval, or a first set power value by which a transmission power is to be reduced. In this way, upon receiving the first configuration information, according to the first interference coordination policy, the UE may delay sending the uplink transmission in the first frequency band for at least a length of the first time interval, or send the uplink transmission in the first frequency band at a transmission power reduced by the first set power value. Delaying sending the uplink transmission in the first frequency band for at least a length of the first time interval is a case of stopping the uplink transmission in the first frequency band in the first time interval.

At step S203, a second time interval for sending control data of downlink transmission in the first frequency band is determined, second configuration information and third configuration information are sent to the UE. The second configuration information is used to instruct the UE to stop the uplink transmission in the first frequency band in the second time interval or to send the uplink transmission in the first frequency band at a reduced transmission power in the second time interval. The third configuration information is used to instruct the UE to stop the uplink transmission in the second frequency band in the second time interval or to send the uplink transmission in the second frequency band at a reduced transmission power in the second time interval.

The second configuration information may be carried in broadcast signaling, upper layer signaling, or physical layer control signaling, sent by the base station, and the third configuration information may also be carried in the broadcast signaling, the upper layer signaling, or the physical layer control signaling sent by the base station.

In this example, after the base station determines that the intermodulation interference exists between the uplink transmission in both the first frequency band and the second frequency band and the downlink transmission in the first frequency band by the UE, the base station may determine a second time interval for sending the control data of the downlink transmission in the first frequency band, and send the second configuration information and the third configuration information to the UE. Thus, in the second time interval, the UE can stop the uplink transmission in the first frequency band or send the uplink transmission in the first frequency band at a reduced transmission power, and in the second time interval, the UE can stop the uplink transmission in the second frequency band or send the uplink transmission in the second frequency band at a reduced transmission power, thereby reducing the intermodulation interference.

Taking FIG. 2C as an example for description, after the base station determines that the intermodulation interference exists between the uplink transmission in both the LTE frequency band and the NR frequency band and the downlink transmission in the LTE frequency band by the UE, the base station may determine a second time interval during which the control data of the downlink transmission in the LTE frequency band is sent, and send second configuration information and third configuration information to the UE. Upon receiving the second configuration information and the third configuration information, the UE may stop the uplink transmission in both the first frequency band and the second frequency band in the second time interval according to the second configuration information and the third configuration information, so as to avoid the intermodulation interference. Upon receiving the second configuration information and the third configuration information, the UE may also send the uplink transmission in both the first frequency band and the second frequency band in the second time interval at a reduced transmission power according to the second configuration information and the third configuration information, so as to reduce the intermodulation interference.

In addition, when the control data includes the control signaling only, each of the second configuration information and the third configuration information may include a second interference coordination policy, and the second interference coordination policy may include: that the UE delays sending the uplink transmission in both the first frequency band and the second frequency band for a length of the second time interval, or a second set power value by which a transmission power is to be reduced. In this way, according to the received second interference coordination policy, the UE may delay sending the uplink transmission in both the first frequency band and the second frequency band for at least a length of the second time interval, or send the uplink transmission in both the first frequency band and the second frequency band at a transmission power reduced by the second set power value. Delaying sending the uplink transmission in both the first frequency band and the second frequency band for at least the length of the second time interval is a case of stopping the uplink transmissions in the first frequency band and in the second frequency band in the second time interval.

In the example, after it is determined that the harmonic interference exists between the uplink transmission in the first frequency band and the downlink transmission in the second frequency band by the UE, the first time interval for sending the control data of the downlink transmission in the second frequency band is determined, and the first configuration information is sent to the UE, so that the UE can stop the uplink transmission in the first frequency band in the first time interval or send the uplink transmission in the first frequency band at a reduced transmission power in the first time interval, thereby achieving the objective of reducing the harmonic interference. Moreover, after determining that the intermodulation interference exists between the uplink transmission in both the first frequency band and the second frequency band and the downlink transmission in the first frequency band by the UE, the second time interval for sending the control data of the downlink transmission in the first frequency band is determined, and the second configuration information and the third configuration information are sent to the UE, so that the UE can stop the uplink transmission in both the first frequency band and the second frequency band in the second time interval according to the second configuration information and the third configuration information, or send the uplink transmission in both the first frequency band and the second frequency band at a reduced transmission power in the second time interval, thereby achieving the objective of reducing the intermodulation interference.

Figure 3:
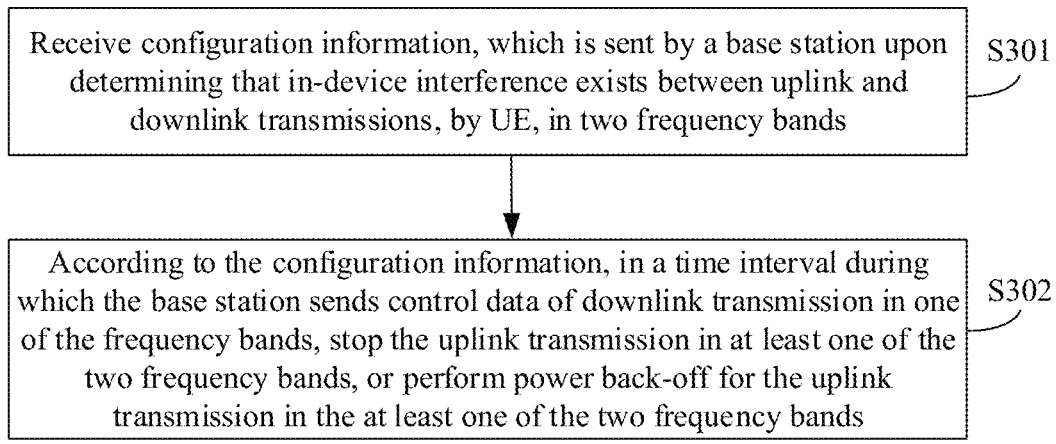
FIG. 3 is a flowchart illustrating still another method of coordinating interference according to an example of the present application.

FIG. 3 is a flowchart illustrating still another method of coordinating interference according to an example of the present application. This example is described from a UE side. As shown in FIG. 3, the method of coordinating interference includes steps S301-S302.

At step S301, configuration information is received, which is sent by a base station upon determining that in-device interference exists between uplink and downlink transmissions, by UE, in two frequency bands.

In this example, the base station can send the configuration information to the UE after determining that the in-device interference exists between the uplink and downlink transmissions in the two frequency bands by the UE. The in-device interference may include harmonic interference and intermodulation interference.

Optionally, in order to improve an accuracy of interference determination for the base station, the UE may also report interference tolerance capability information thereof to the base station, so that the base station can determine whether the harmonic interference or the intermodulation interference exists between the uplink and downlink transmissions in the two frequency bands by the UE according to the interference tolerance capability information and the information on the UE accessing a network.

At step S302, according to the configuration information, in a time interval during which the base station sends control data of downlink transmission in one of the two frequency bands, uplink transmission in at least one of the two frequency bands is stopped, or power back-off is performed for the uplink transmission in the at least one of the two frequency bands.

According to the configuration information, the UE may stop the uplink transmission in at least one of the two frequency bands or perform power back-off for the uplink transmission in the at least one of the two frequency bands in a time interval during which the base station sends control data of downlink transmission in one of the two frequency bands, thereby achieving an objective of reducing the interference to a control channel in the device.

In the example, upon receiving the configuration information, according to the configuration information, in a time interval during which the base station sends the control data of the downlink transmission in one of the two frequency bands, the UE may stop the uplink transmission in at least one of the two frequency bands or perform power back-off for the uplink transmission in the at least one of the two frequency bands, thereby achieving the objective of reducing the interference to the control channel in the device.

Figure 4A:
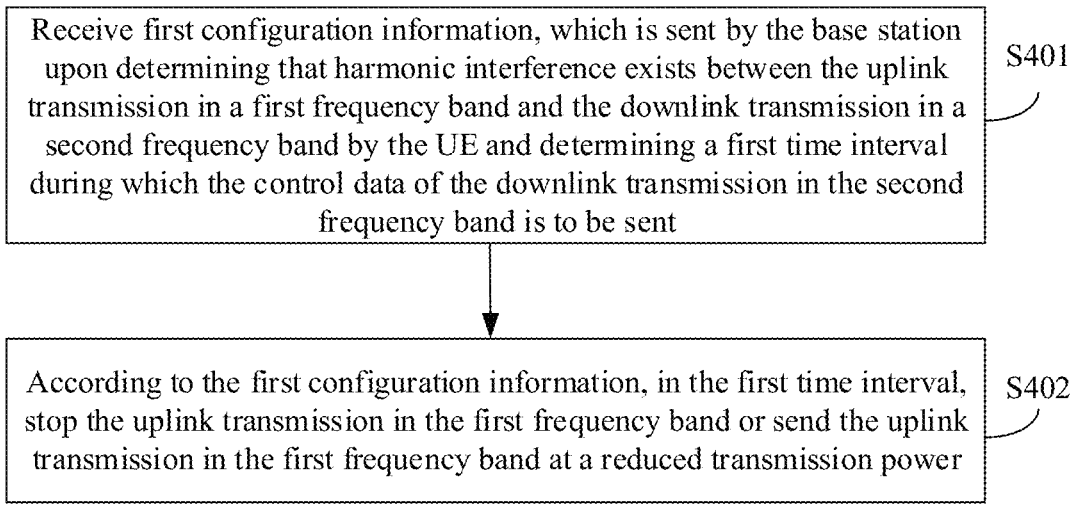
FIG. 4A is a flowchart illustrating yet another method of coordinating interference according to an example of the present application.

FIG. 4A is a flowchart illustrating yet another method of coordinating interference according to an example of the present application. This example is described from a UE side. As shown in FIG. 4A, the method of coordinating interference includes steps S401-S402.

At step S401, first configuration information is received, which is sent by the base station upon determining that harmonic interference exists between the uplink transmission in a first frequency band and the downlink transmission in a second frequency band by the UE and determining a first time interval during which the control data of the downlink transmission in the second frequency band is to be sent.

The first frequency band may belong to a frequency band for LTE, and the second frequency band may belong to a frequency band for NR. Alternatively, the first frequency band and the second frequency band may also belong to two frequency bands for the NR respectively.

The control data may include control signaling and a reference signal, or may include only control signaling. The control signaling may include, but is not limited to, a PDCCH. The first configuration information may be carried in broadcast signaling, upper layer signaling, or physical layer control signaling, sent by the base station.

In this example, after base station determines that the harmonic interference exists between the uplink transmission in the first frequency band and the downlink transmission in the second frequency band by the UE, the base station may determine a first time interval during which the control data of the downlink transmission in the second frequency band is to be sent, and send first configuration information to the UE.

At step S402, according to the first configuration information, the uplink transmission in the first frequency band is stopped in the first time interval or the uplink transmission in the first frequency band is sent at a reduced transmission power in the first time interval.

Upon receiving the first configuration information, the UE may stop the uplink transmission in the first frequency band in the first time interval, or send the uplink transmission in the first frequency band at the reduced transmission power in the first time interval.

Figure 4B:
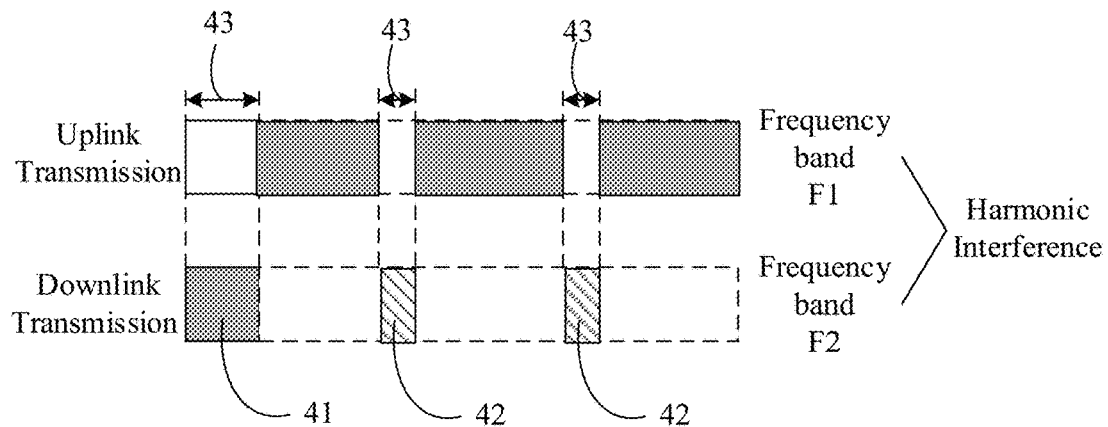
FIG. 4B is a schematic diagram illustrating interference coordination according to an example of the present application.

For example, as shown in FIG. 4B, harmonic interference exists between an uplink transmission in frequency band F1 and a downlink transmission in frequency band F2 by the UE. Control data of the downlink transmission in frequency band F2 includes PDCCH 41 and reference signal 42. To avoid the harmonic interference, the UE may stop the uplink transmission in frequency band F1 in first time interval 43. To reduce the harmonic interference, the UE may send the uplink transmission in frequency band F1 at a reduced transmission power in first time interval 43.

In addition, when the control data includes the control signaling only, the first configuration information may include a first interference coordination policy, and the first interference coordination policy may include: that the UE delays sending the uplink transmission in the first frequency band for a length of the first time interval, or a first set power value by which a transmission power is to be reduced. In this way, upon receiving the first configuration information, according to the first interference coordination policy, the UE may delay sending the uplink transmission in the first frequency band for at least a length of the first time interval, or send the uplink transmission in the first frequency band at a transmission power reduced by the first set power value. Delaying sending the uplink transmission in the first frequency band for at least a length of the first time interval is a case of stopping the uplink transmission in the first frequency band in the first time interval.

Figure 4C:
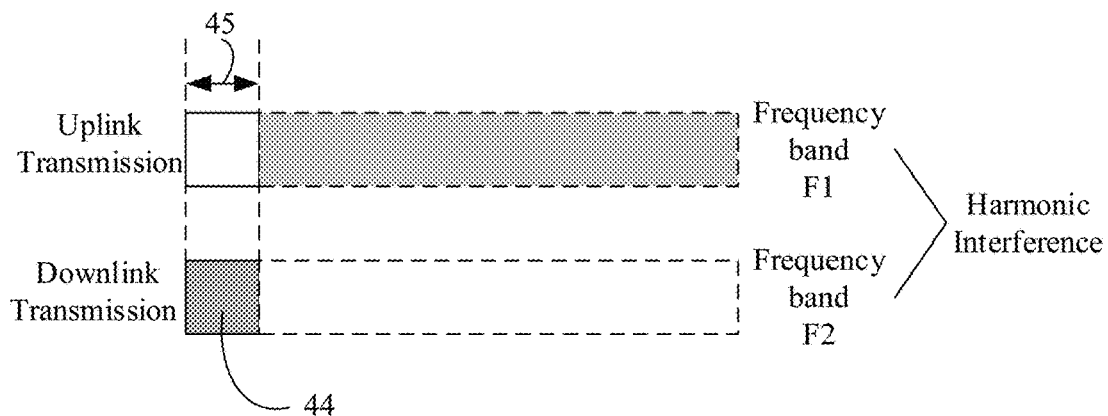
FIG. 4C is a schematic diagram illustrating another interference coordination according to an example of the present application.
Figure 4D:
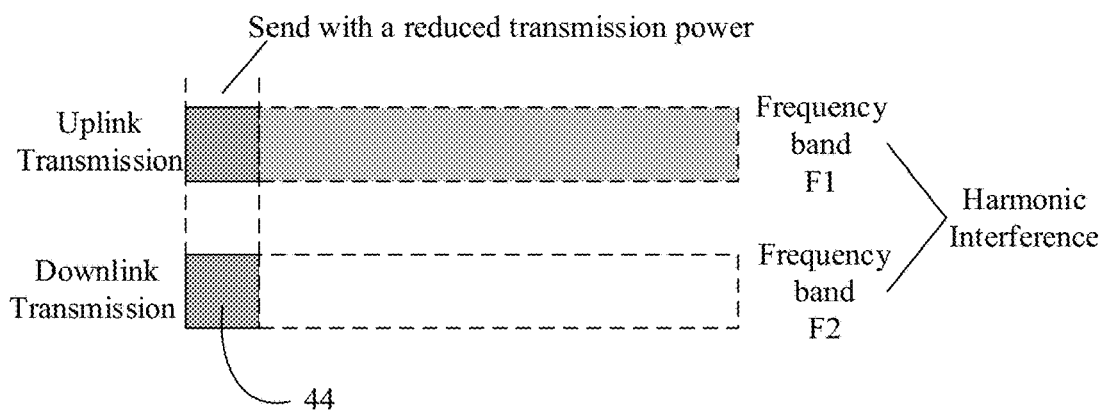
FIG. 4D is a schematic diagram illustrating still another interference coordination according to an example of the present application.

For example, as shown in FIG. 4C and FIG. 4D, harmonic interference exists between an uplink transmission in frequency band F1 and a downlink transmission in frequency band F2 by the UE. Control data of the downlink transmission in frequency band F2 includes PDCCH 44. In order to avoid the harmonic interference, as shown in FIG. 4C, the UE may delay sending the uplink transmission in frequency band F1 for a length of first time interval 45. As shown in FIG. 4D, in order to reduce the harmonic interference, the UE may send the uplink transmission in frequency band F1 at a reduced transmission power in first time interval 45.

In the example, upon receiving the first configuration information sent by the base station, according to the first configuration information, the uplink transmission in the first frequency band may be stopped in the first time interval or the uplink transmission in the first frequency band is sent at a reduced transmission power in the first time interval, thereby achieving an objective of reducing the harmonic interference.

Figure 4E:
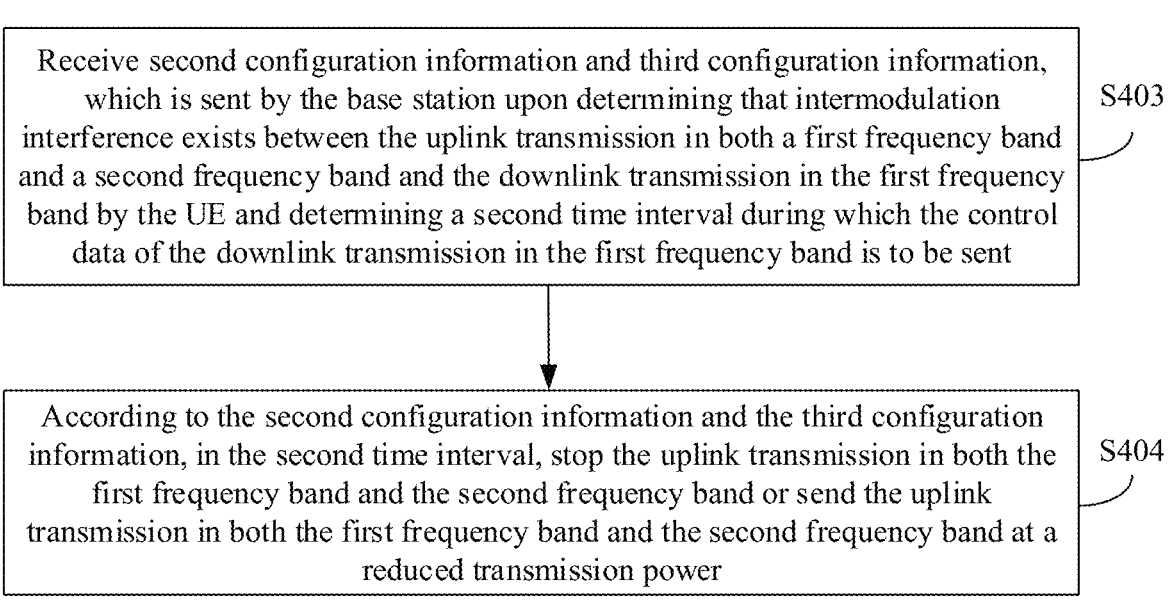
FIG. 4E is a flowchart illustrating yet another method of coordinating interference according to an example of the present application.

FIG. 4E is a flowchart illustrating yet another method of coordinating interference according to an example of the present application. This example is described from a UE side. As shown in FIG. 4E, the method of coordinating interference includes steps S403-S404.

At step S403, second configuration information and third configuration information are received, which are sent by the base station upon determining that intermodulation interference exists between the uplink transmission in both a first frequency band and a second frequency band and the downlink transmission in the first frequency band by the UE and determining a second time interval during which the control data of the downlink transmission in the first frequency band is to be sent.

The second configuration information may be carried in broadcast signaling, upper layer signaling, or physical layer control signaling sent by the base station, and the third configuration information may also be carried in the broadcast signaling, the upper layer signaling, or the physical layer control signaling sent by the base station.

In this example, after the base station determines that the intermodulation interference exists between the uplink transmission in both the first frequency band and the second frequency band and the downlink transmission in the first frequency band by the UE, the base station may determine a second time interval for sending the control data of the downlink transmission in the first frequency band, and send the second configuration information and the third configuration information to the UE.

At step S404, according to the second configuration information and the third configuration information, the uplink transmissions in the first frequency band and in the second frequency band are stopped or the uplink transmissions in the first frequency band and in the second frequency band are sent at a reduced transmission power in the second time interval.

Upon receiving the second configuration information and the third configuration information, the UE can stop the uplink transmission in both the first frequency band and the second frequency band in the second time interval or sent the uplink transmissions in both the first frequency band and the second frequency band at the reduced transmission power in the second time interval according to the second configuration information and the third configuration information, thereby reducing the intermodulation interference.

In addition, when the control data includes the control signaling only, each of the second configuration information and the third configuration information may include a second interference coordination policy, and the second interference coordination policy may include: that the UE delays sending the uplink transmission in both the first frequency band and the second frequency band for a length of the second time interval, or a second set power value by which a transmission power is to be reduced. In this way, according to the received second interference coordination policy, the UE may delay sending the uplink transmission in both the first frequency band and the second frequency band for at least a length of the second time interval, or send the uplink transmission in both the first frequency band and the second frequency band at a transmission power reduced by the second set power value. Delaying sending the uplink transmission in both the first frequency band and the second frequency band for at least the length of the second time interval is a case of stopping the uplink transmissions in the first frequency band and in the second frequency band in the second time interval.

In the example, upon receiving the second configuration information and the third configuration information sent by the base station, and according to the second configuration information and the third configuration information, the uplink transmission in both the first frequency band and the second frequency band may be stopped in the second time interval or the uplink transmission in both the first frequency band and the second frequency band may be sent at the reduced transmission power in the second time interval, thereby reducing the intermodulation interference.

Figure 5:
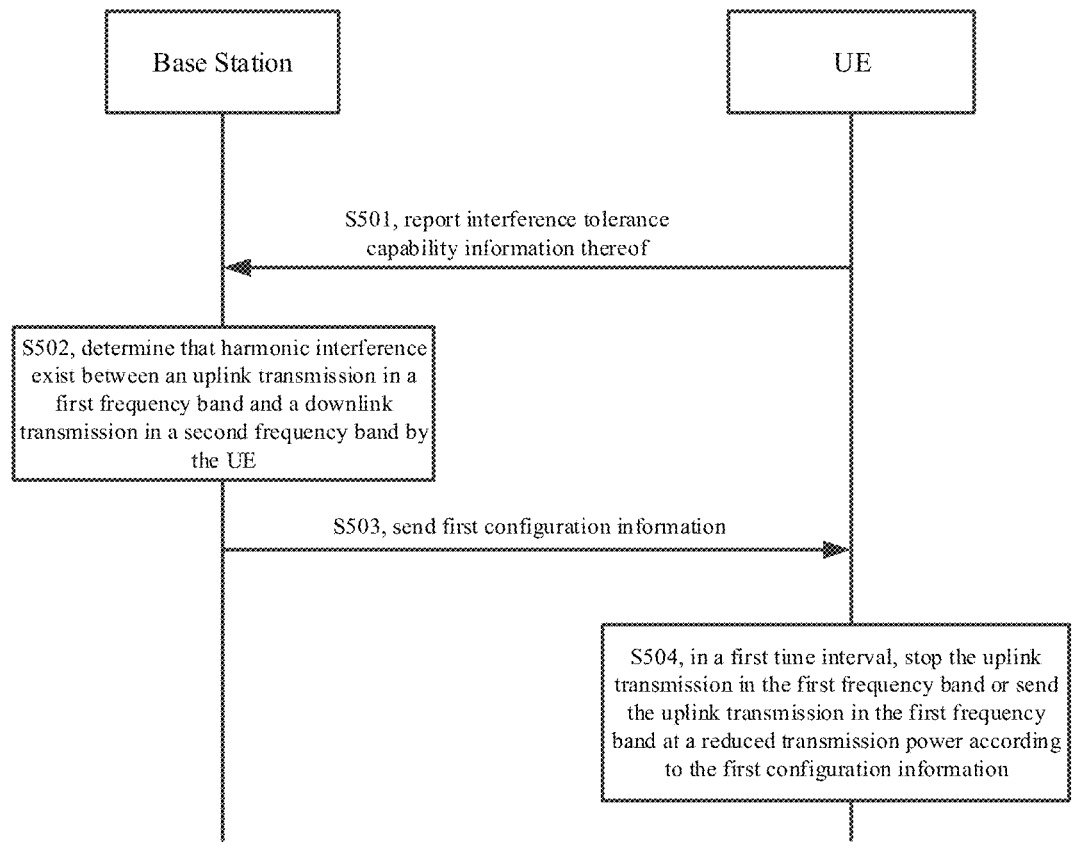
FIG. 5 is a signaling flowchart illustrating a method of coordinating interference according to an example of the present application.

FIG. 5 is a signaling flowchart illustrating a method of coordinating interference according to an example of the present application. This example is described from the perspective of interaction between a base station and UE. As shown in FIG. 5, the method of coordinating interference includes steps S501-S504.

At step S501, the UE reports interference tolerance capability information thereof to the base station.

At step S502, the base station receives the interference tolerance capability information of the UE, and based on the interference tolerance capability information of the UE and the information on the UE accessing a network, determines that harmonic interference exists between an uplink transmission in a first frequency band and a downlink transmission in a second frequency band by the UE.

At step S503, the base station determines a first time interval for sending control data of the downlink transmission in the second frequency band, and sends first configuration information to the UE.

At step S504, the UE receives the first configuration information, and stops the uplink transmission in the first frequency band in the first time interval or sends the uplink transmission in the first frequency band at a reduced transmission power in the first time interval according to the first configuration information.

In the example, the interaction between the base station and the UE enables the UE to stop the uplink transmission in the first frequency band in the first time interval or send the uplink transmission in the first frequency band at the reduced transmission power in the first time interval, where the first time interval is for sending the control data of the downlink transmission in the second frequency band, thereby achieving an objective of reducing the harmonic interference.

Figure 6:
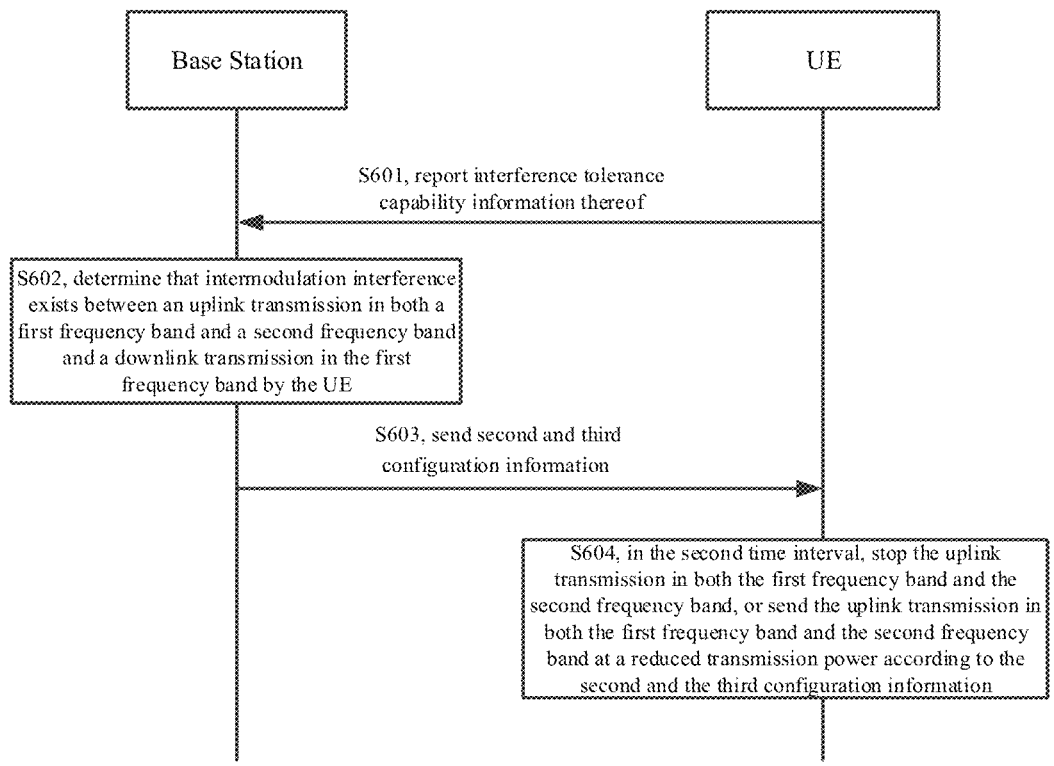
FIG. 6 is a signaling flowchart illustrating another method of coordinating interference according to an example of the present application.

FIG. 6 is a signaling flowchart illustrating another method of coordinating interference according to an example of the present application. This example is described from the perspective of interaction between a base station and UE. As shown in FIG. 6, the method of coordinating interference includes steps S601-S604.

At step S601, the UE reports interference tolerance capability information thereof to the base station.

At step S602, the base station receives the interference tolerance capability information of the UE, and based on the interference tolerance capability information of the UE and the information on the UE accessing a network, determines that intermodulation interference exists between the uplink transmission in both a first frequency band and a second frequency band and a downlink transmission in the first frequency band by the UE.

At step S603, the base station determines a second time interval for sending control data of the downlink transmission in the first frequency band, and sends second configuration information and third configuration information to the UE.

At step S604, the UE receives the second configuration information and the third configuration information sent by the base station, and stops the uplink transmissions in the first frequency band and in the second frequency band in the second time interval or sends the uplink transmissions in the first frequency band and in the second frequency band at a reduced transmission power in the second time interval according to the second configuration information and the third configuration information.

In the example, the interaction between the base station and the UE enables the UE to stop the uplink transmissions in the first frequency band and in the second frequency band in the second time interval or send the uplink transmissions in the first frequency band and in the second frequency band at the reduced transmission power in the second time interval, where the second time interval is for sending the control data of the downlink transmission in the first frequency band, thereby reducing the intermodulation interference.

Figure 7:
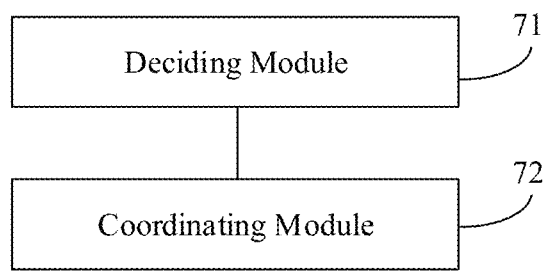
FIG. 7 is a block diagram illustrating an apparatus for coordinating interference according to an example.

FIG. 7 is a block diagram illustrating an apparatus for coordinating interference according to an example. The apparatus for coordinating interference may be provided in a base station. As shown in FIG. 7, the apparatus for coordinating interference includes a determining module 71 and a coordinating module 72.

The determining module 71 is configured to determine whether in-device interference exists between uplink and downlink transmissions, by UE, in two frequency bands.

In this example, the base station may determine whether the in-device interference exists between the uplink and downlink transmissions, by the UE, in the two frequency bands according to information on the UE accessing a network, where the in-device interference may include harmonic interference and intermodulation interference.

When integer multiples of one frequency band at least partially overlap with another frequency band, harmonic interference may occur between uplink and downlink transmissions in these two frequency bands.

Intermodulation interference (IM interference) refers to that when two or more interfering signals are added to a receiver at the same time, due to a non-linear effect, the frequencies of resultant components formed by the interfering signals are sometimes equal to or close to a frequency of a desired signal, and thus the resultant components pass straight through the receiver and cause interference.

The coordinating module 72 is configured to, when the determining module determines that the in-device interference exists between the uplink and downlink transmissions in the two frequency bands by the UE, send configuration information to the UE, where the configuration information is used to instruct the UE to, in a time interval during which a base station sends control data of the downlink transmission in one of the two frequency bands, stop the uplink transmission in at least one of the two frequency bands or perform power back-off for the uplink transmission in the at least one of the two frequency bands.

In this example, if the base station determines that the in-device interference, such as harmonic interference or intermodulation interference, exists between the uplink and downlink transmissions, by the UE, in the two frequency bands, the base station may send configuration information to the UE, and the UE can stop an uplink transmission in at least one of the two frequency bands in a time interval during which the base station sends control data of a downlink transmission in one of the two frequency bands according to the configuration information, thereby avoiding the interference to a control channel in the device. And the UE may also perform power back-off for an uplink transmission in at least one of the two frequency bands in a time interval during which the base station sends the control data of the downlink transmission in one of the two frequency bands according to the configuration information, thereby achieving an objective of reducing the interference to the control channel in the device.

In an example, the coordinating module 72 may be configured to, when it is determined that harmonic interference exists between the uplink transmission in a first frequency band and the downlink transmission in a second frequency band by the UE, determine a first time interval during which the control data of the downlink transmission in the second frequency band is to be sent, and send first configuration information to the UE, where the first configuration information is used to instruct the UE to, in the first time interval, stop the uplink transmission in the first frequency band or to send the uplink transmission in the first frequency band at a reduced transmission power.

The control data may include control signaling and a reference signal, or may include only control signaling. The control signaling may include, but is not limited to, a PDCCH. The first configuration information may be carried in broadcast signaling, upper layer signaling, or physical layer control signaling, sent by the base station.

In this example, after base station determines that the harmonic interference exists between the uplink transmission in the first frequency band and the downlink transmission in the second frequency band by the UE, the base station may determine a first time interval during which the control data of the downlink transmission in the second frequency band is to be sent, and send first configuration information to the UE, so that the UE can stop the uplink transmission in the first frequency band or send the uplink transmission in the first frequency band at a reduced transmission power in the first time interval.

Taking FIG. 2B as an example for description, after the base station determines that the harmonic interference exists between the uplink transmission in the LTE frequency band and the downlink transmission in the NR frequency band by the UE, the base station may determine a first time interval for sending control data of the downlink transmission in the NR frequency band, and send first configuration information to the UE. Upon receiving the first configuration information, the UE may stop the uplink transmission in the LTE frequency band in the first time interval according to the first configuration information, so as to avoid the harmonic interference. Upon receiving the first configuration information, the UE may also send the uplink transmission in the LTE frequency band at a reduced transmission power according to the configuration information, so as to reduce the harmonic interference.

In addition, when the control data includes the control signaling only, the first configuration information may include a first interference coordination policy, and the first interference coordination policy may include: that the UE delays sending the uplink transmission in the first frequency band for a length of the first time interval, or a first set power value by which a transmission power is to be reduced. In this way, upon receiving the first configuration information, according to the first interference coordination policy, the UE may delay sending the uplink transmission in the first frequency band for at least a length of the first time interval, or send the uplink transmission in the first frequency band at a transmission power reduced by the first set power value. Delaying sending the uplink transmission in the first frequency band for at least a length of the first time interval is a case of stopping the uplink transmission in the first frequency band in the first time interval.

In another example, the coordinating module 72 may be configured to, when it is determined that intermodulation interference exists between the uplink transmission in both a first frequency band and a second frequency band and the downlink transmission in the first frequency band by the UE, determine a second time interval during which the control data of the downlink transmission in the first frequency band is to be sent, and send second configuration information and third configuration information to the UE, where the second configuration information is used to instruct the UE to, in the second time interval, stop the uplink transmission in the first frequency band or send the uplink transmission in the first frequency band at a reduced transmission power, and the third configuration information is used to instruct the UE to, in the second time interval, stop the uplink transmission in the second frequency band or send the uplink transmission in the second frequency band at the reduced transmission power.

The second configuration information may be carried in broadcast signaling, upper layer signaling, or physical layer control signaling, sent by the base station, and the third configuration information may also be carried in the broadcast signaling, the upper layer signaling, or the physical layer control signaling, sent by the base station.

In this example, after the base station determines that the intermodulation interference exists between the uplink transmission in both the first frequency band and the second frequency band and the downlink transmission in the first frequency band by the UE, the base station may determine a second time interval for sending the control data of the downlink transmission in the first frequency band, and send the second configuration information and the third configuration information to the UE. Thus, in the second time interval, the UE can stop the uplink transmission in the first frequency band or send the uplink transmission in the first frequency band at a reduced transmission power, and in the second time interval, the UE can stop the uplink transmission in the second frequency band or send the uplink transmission in the second frequency band at a reduced transmission power, thereby reducing the intermodulation interference.

Taking FIG. 2C as an example for description, after the base station determines that the intermodulation interference exists between the uplink transmission in both the LTE frequency band and the NR frequency band and the downlink transmission in the LTE frequency band by the UE, the base station may determine a second time interval during which the control data of the downlink transmission in the LTE frequency band is sent, and send second configuration information and third configuration information to the UE. Upon receiving the second configuration information and the third configuration information, the UE may stop the uplink transmission in both the first frequency band and the second frequency band in the second time interval according to the second configuration information and the third configuration information, so as to avoid the intermodulation interference. Upon receiving the second configuration information and the third configuration information, the UE may also send the uplink transmission in both the first frequency band and the second frequency band in the second time interval at a reduced transmission power according to the second configuration information and the third configuration information, so as to reduce the intermodulation interference.

In addition, when the control data includes the control signaling only, each of the second configuration information and the third configuration information may include a second interference coordination policy, and the second interference coordination policy may include: that the UE delays sending the uplink transmission in both the first frequency band and the second frequency band for a length of the second time interval, or a second set power value by which a transmission power is to be reduced. In this way, according to the received second interference coordination policy, the UE may delay sending the uplink transmission in both the first frequency band and the second frequency band for at least a length of the second time interval, or send the uplink transmission in both the first frequency band and the second frequency band at a transmission power reduced by the second set power value. Delaying sending the uplink transmission in both the first frequency band and the second frequency band for at least the length of the second time interval is a case of stopping the uplink transmissions in the first frequency band and in the second frequency band in the second time interval.

In the example, when it is determined that the in-device interference exists between the uplink and downlink transmissions in two frequency bands by the UE, the configuration information is sent to the UE, so that the UE can stop the uplink transmission in at least one of the two frequency bands or perform power back-off for the uplink transmission in the at least one of the two frequency bands in a time interval during which the base station sends control data of the downlink transmission in one of the two frequency bands, thereby achieving the objective of reducing the interference to the control channel in the device.

Figure 8:
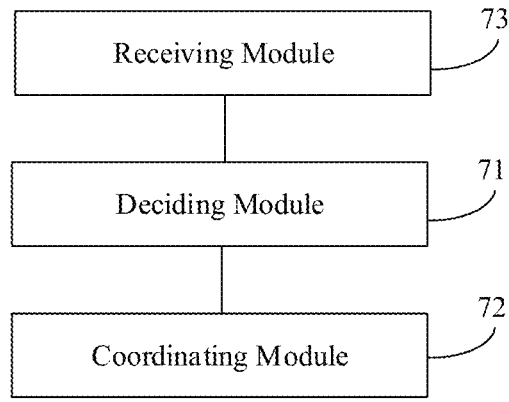
FIG. 8 is a block diagram illustrating another apparatus for coordinating interference according to an example.

FIG. 8 is a block diagram illustrating another apparatus for coordinating interference according to an example. As shown in FIG. 8, based on the example shown in FIG. 7, the apparatus may also include a receiving module 73.

The receiving module 73 is configured to receive the interference tolerance capability information reported by the UE before the determining module 71 determines whether the in-device interference exists between the uplink and downlink transmissions, by the UE, in the two frequency bands.

The determining module 71 is configured to determine whether the in-device interference exists between the uplink and downlink transmissions, by the UE, in the two frequency bands according to the interference tolerance capability information which is received by the receiving module and information on the UE accessing a network.

In this example, the base station may determine whether the harmonic interference or the intermodulation interference exists between the uplink transmission and the downlink transmission, by the UE, in the two frequency bands according to the information on the UE accessing the network. In order to improve an accuracy of the decision, it is also possible to first receive interference tolerance capability information reported by the UE, and then determine whether the harmonic interference or the intermodulation interference exists between the uplink transmission and the downlink transmission, by the UE, in the two frequency bands according to the interference tolerance capability information and the information of the UE accessing the network.

The first frequency band may belong to a frequency band for LTE, and the second frequency band may belong to a frequency band for NR. Alternatively, the first frequency band and the second frequency band may also belong to two frequency bands for the NR respectively.

Assuming that the first frequency band is an LTE frequency band and the second frequency band is an NR frequency band, as shown in FIG. 2B, harmonic waves of uplink (UL) transmission 21 in the LTE frequency band may interference downlink (DL) transmission 22 in the NR frequency band for the UE. As shown in FIG. 2C, intermodulation components formed by uplink transmission 24 in the LTE frequency band and uplink transmission 25 in the NR frequency band may interference downlink transmission 26 in the LTE frequency band for the UE.

In the above example, by receiving the interference tolerance capability information reported by the UE, based on the interference tolerance capability information and the information on the UE accessing the network, it can be determined whether the harmonic interference or the intermodulation interference exists between the uplink and downlink transmissions of the two frequency bands by the UE, thereby improving an accuracy for determining interference.

Figure 9:
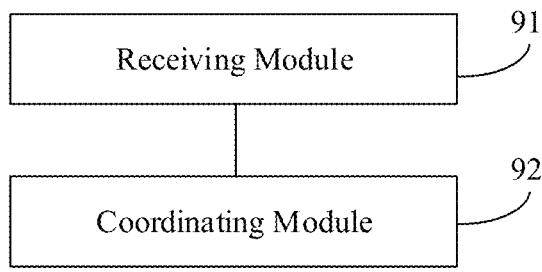
FIG. 9 is a block diagram illustrating still another apparatus for coordinating interference according to an example.

FIG. 9 is a block diagram illustrating still another apparatus for coordinating interference according to an example. The apparatus for coordinating interference may be provided in UE. As shown in FIG. 9, the apparatus for coordinating interference includes a receiving module 91 and a coordinating module 92.

The receiving module 91 is configured to receive configuration information, which is sent by a base station upon determining that in-device interference exists between uplink and downlink transmissions, by UE, in two frequency bands.

In this example, the base station can send the configuration information to the UE after determining that the in-device interference exists between the uplink and downlink transmissions in the two frequency bands by the UE. The in-device interference may include harmonic interference and intermodulation interference.

Optionally, in order to improve an accuracy of interference determination for the base station, the UE may also report interference tolerance capability information thereof to the base station, so that the base station can determine whether the harmonic interference or the intermodulation interference exists between the uplink and downlink transmissions in the two frequency bands by the UE according to the interference tolerance capability information and the information on the UE accessing a network.

The coordinating module 92 is configured to, according to the configuration information received by the receiving module, in a time interval during which the base station sends control data of the downlink transmission in one of the two frequency bands, stop the uplink transmission in at least one of the two frequency bands or perform power back-off for the uplink transmission in the at least one of the two frequency bands.

According to the configuration information, the UE may stop the uplink transmission in at least one of the two frequency bands or perform power back-off for the uplink transmission in the at least one of the two frequency bands in a time interval during which the base station sends control data of downlink transmission in one of the two frequency bands, thereby achieving an objective of reducing the interference to a control channel in the device.

In the example, upon receiving the configuration information, according to the configuration information, in a time interval during which the base station sends the control data of the downlink transmission in one of the two frequency bands, the UE may stop the uplink transmission in at least one of the two frequency bands or perform power back-off for the uplink transmission in the at least one of the two frequency bands, thereby achieving the objective of reducing the interference to the control channel in the device.

Figure 10A:
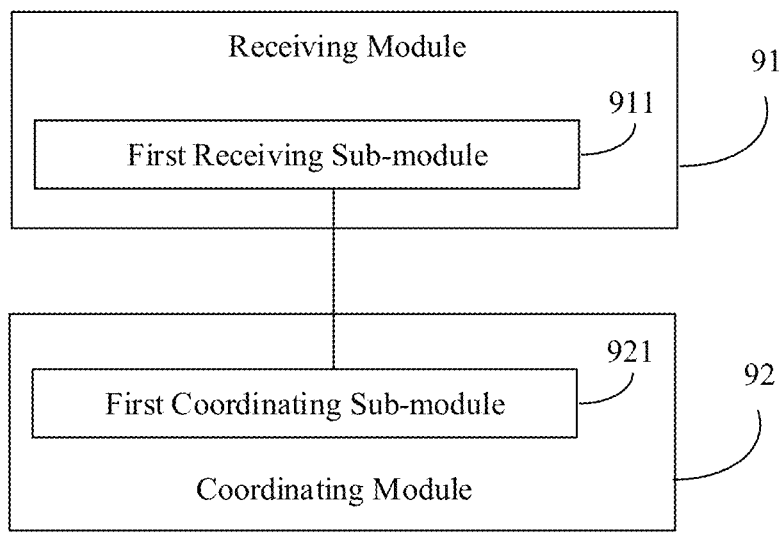
FIG. 10A is a block diagram illustrating yet another apparatus for coordinating interference according to an example.

FIG. 10A is a block diagram illustrating yet another apparatus for coordinating interference according to an example. As shown in FIG. 10A, based on the example shown in FIG. 9, the receiving module 91 may include a first receiving sub-module 911.

The first receiving sub-module 911 is configured to receive first configuration information, which is sent by the base station upon determining that harmonic interference exists between the uplink transmission in a first frequency band and the downlink transmission in a second frequency band by the UE and determining a first time interval during which the control data of the downlink transmission in the second frequency band is to be sent.

The first frequency band may belong to a frequency band for LTE, and the second frequency band may belong to a frequency band for NR. Alternatively, the first frequency band and the second frequency band may also belong to two frequency bands for the NR respectively.

The control data may include control signaling and a reference signal, or may include only control signaling. The control signaling may include, but is not limited to, a PDCCH. The first configuration information may be carried in broadcast signaling, upper layer signaling, or physical layer control signaling, sent by the base station.

In this example, after base station determines that the harmonic interference exists between the uplink transmission in the first frequency band and the downlink transmission in the second frequency band by the UE, the base station may determine a first time interval during which the control data of the downlink transmission in the second frequency band is to be sent, and send first configuration information to the UE.

The coordinating module 92 may include a first coordinating sub-module 921.

The first coordinating sub-module 921 is configured to, according to the first configuration information received by the first receiving sub-module 911, in the first time interval, stop the uplink transmission in the first frequency band or send the uplink transmission in the first frequency band at a reduced transmission power.

Upon receiving the first configuration information, the UE may stop the uplink transmission in the first frequency band in the first time interval, or send the uplink transmission in the first frequency band at the reduced transmission power in the first time interval.

For example, as shown in FIG. 4B, harmonic interference exists between an uplink transmission in frequency band F1 and a downlink transmission in frequency band F2 by the UE. Control data of the downlink transmission in frequency band F2 includes PDCCH 41 and reference signal 42. To avoid the harmonic interference, the UE may stop the uplink transmission in frequency band F1 in first time interval 43. To reduce the harmonic interference, the UE may send the uplink transmission in frequency band F1 at a reduced transmission power in first time interval 43.

In addition, when the control data includes the control signaling only, the first configuration information may include a first interference coordination policy, and the first interference coordination policy may include: that the UE delays sending the uplink transmission in the first frequency band for a length of the first time interval, or a first set power value by which a transmission power is to be reduced. In this way, upon receiving the first configuration information, according to the first interference coordination policy, the UE may delay sending the uplink transmission in the first frequency band for at least a length of the first time interval, or send the uplink transmission in the first frequency band at a transmission power reduced by the first set power value. Delaying sending the uplink transmission in the first frequency band for at least a length of the first time interval is a case of stopping the uplink transmission in the first frequency band in the first time interval.

For example, as shown in FIG. 4C and FIG. 4D, harmonic interference exists between an uplink transmission in frequency band F1 and a downlink transmission in frequency band F2 by the UE. Control data of the downlink transmission in frequency band F2 includes PDCCH 44. In order to avoid the harmonic interference, as shown in FIG. 4C, the UE may delay sending the uplink transmission in frequency band F1 for a length of first time interval 45. As shown in FIG. 4D, in order to reduce the harmonic interference, the UE may send the uplink transmission in frequency band F1 at a reduced transmission power in first time interval 45.

In the example, upon receiving the first configuration information sent by the base station, according to the first configuration information, the uplink transmission in the first frequency band may be stopped in the first time interval or the uplink transmission in the first frequency band is sent at a reduced transmission power in the first time interval, thereby achieving an objective of reducing the harmonic interference.

Figure 10B:
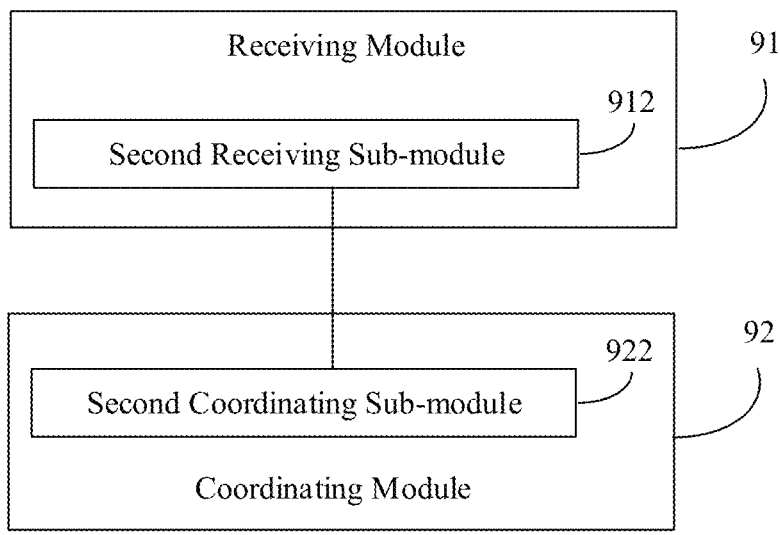
FIG. 10B is a block diagram illustrating yet another apparatus for coordinating interference according to an example.

FIG. 10B is a block diagram illustrating yet another apparatus for coordinating interference according to an example. As shown in FIG. 10B, based on the example shown in FIG. 9, the receiving module 91 may include a second receiving sub-module 912.

The second receiving sub-module 912 is configured to receive second configuration information and third configuration information, which are sent by the base station upon determining that intermodulation interference exists between the uplink transmission in both a first frequency band and a second frequency band and the downlink transmission in the first frequency band by the UE and determining a second time interval during which the control data of the downlink transmission in the first frequency band is to be sent.

The second configuration information may be carried in the broadcast signaling, the upper layer signaling, or the physical layer control signaling sent by the base station, and the third configuration information may also be carried in b the broadcast signaling, the upper layer signaling, or the physical layer control signaling sent by the base station.

In this example, after the base station determines that the intermodulation interference exists between the uplink transmission in both the first frequency band and the second frequency band and the downlink transmission in the first frequency band by the UE, the base station may determine a second time interval for sending the control data of the downlink transmission in the first frequency band, and send the second configuration information and the third configuration information to the UE.

The coordinating module 92 may include a second coordinating sub-module 922.

The second coordinating sub-module 922 is configured to, according to the second configuration information and the third configuration information received by the second receiving sub-module 912, in the second time interval, stop the uplink transmission in both the first frequency band and the second frequency band or send the uplink transmission in both the first frequency band and the second frequency band at a reduced transmission power.

Upon receiving the second configuration information and the third configuration information, the UE can stop the uplink transmission in both the first frequency band and the second frequency band in the second time interval or sent the uplink transmissions in both the first frequency band and the second frequency band at the reduced transmission power in the second time interval according to the second configuration information and the third configuration information, thereby reducing the intermodulation interference.

In addition, when the control data includes the control signaling only, each of the second configuration information and the third configuration information may include a second interference coordination policy, and the second interference coordination policy may include: that the UE delays sending the uplink transmission in both the first frequency band and the second frequency band for a length of the second time interval, or a second set power value by which a transmission power is to be reduced. In this way, according to the received second interference coordination policy, the UE may delay sending the uplink transmission in both the first frequency band and the second frequency band for at least a length of the second time interval, or send the uplink transmission in both the first frequency band and the second frequency band at a transmission power reduced by the second set power value. Delaying sending the uplink transmission in both the first frequency band and the second frequency band for at least the length of the second time interval is a case of stopping the uplink transmissions in the first frequency band and in the second frequency band in the second time interval.

In the example, upon receiving the second configuration information and the third configuration information sent by the base station, and according to the second configuration information and the third configuration information, the uplink transmission in both the first frequency band and the second frequency band may be stopped in the second time interval or the uplink transmission in both the first frequency band and the second frequency band may be sent at the reduced transmission power in the second time interval, thereby reducing the intermodulation interference.

Figure 10C:
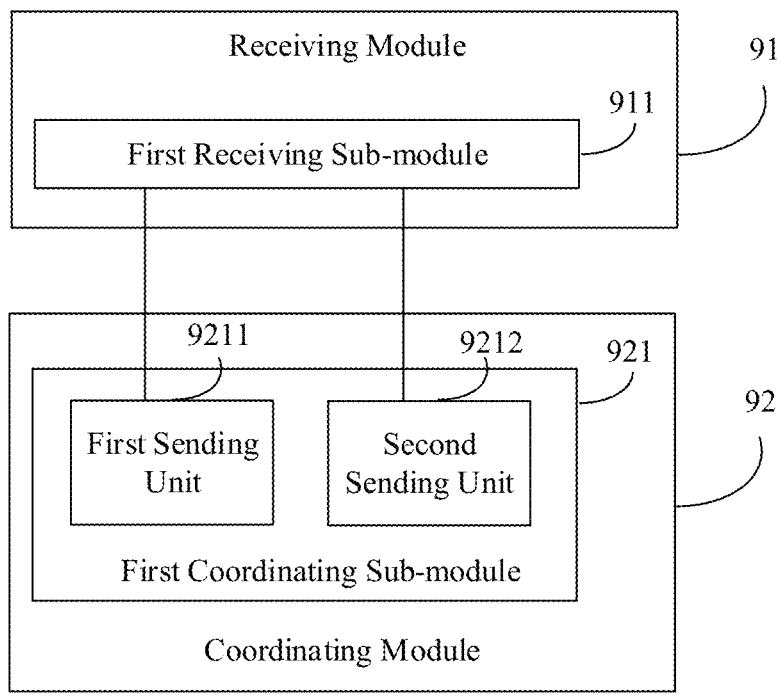
FIG. 10C is a block diagram illustrating yet another apparatus for coordinating interference according to an example.

FIG. 10C is a block diagram illustrating yet another apparatus for coordinating interference according to an example. As shown in FIG. 10C, based on the example shown in FIG. 10A, the first coordinating sub-module 921 may include: a first sending unit 9211 or a second sending unit 9212.

The first sending unit 9211 is configured to according to the first interference coordination policy, delay sending the uplink transmission in the first frequency band for at least a length of the first time interval.

The second sending unit 9212 is configured to send the uplink transmission in the first frequency band at a transmission power reduced by the first set power value.

In the above example, by delaying sending the uplink transmission in the first frequency band for a length of the first time interval, or sending the uplink transmission in the first frequency band at a transmission power reduced by a first set power value, the harmonic interference is reduced.

Figure 10D:
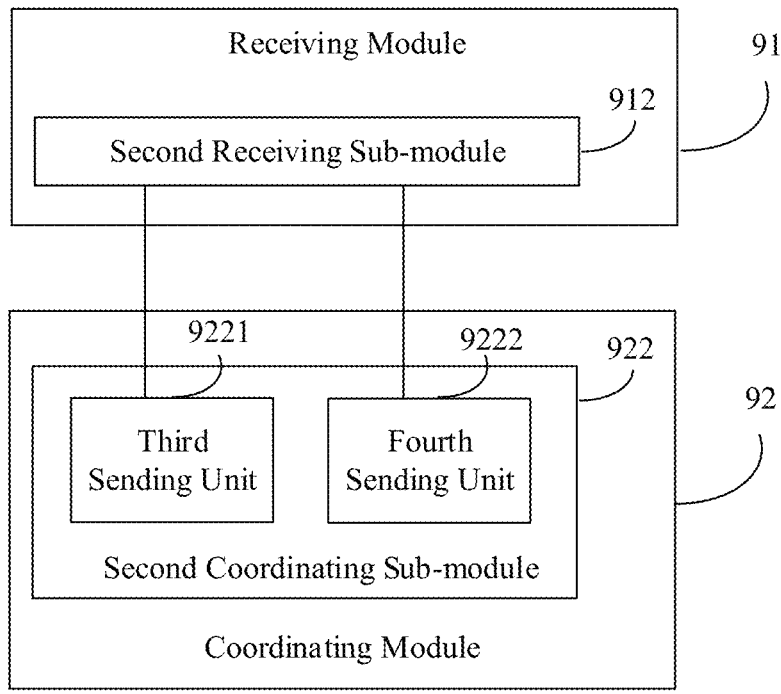
FIG. 10D is a block diagram illustrating yet another apparatus for coordinating interference according to an example.

FIG. 10D is a block diagram illustrating yet another apparatus for coordinating interference according to an example. As shown in FIG. 10D, based on the example shown in FIG. 10B, the second coordinating sub-module 922 may include: a third sending unit 9221 or a fourth sending unit 9222.

The third sending unit 9221 is configured to according to the second interference coordination policy, delay sending the uplink transmission in both the first frequency band and the second frequency band for at least a length of the second time interval.

The fourth sending unit 9222 is configured to send the uplink transmission in both the first frequency band and the second frequency band at a transmission power reduced by the second set power value.

In the above example, by delaying sending the uplink transmission in both the first frequency band and the second frequency band for at least a length of the second time interval, or sending the uplink transmission in both the first frequency band and the second frequency band at a transmission power reduced by a second set power value, the intermodulation interference is reduced.

Figure 10E:
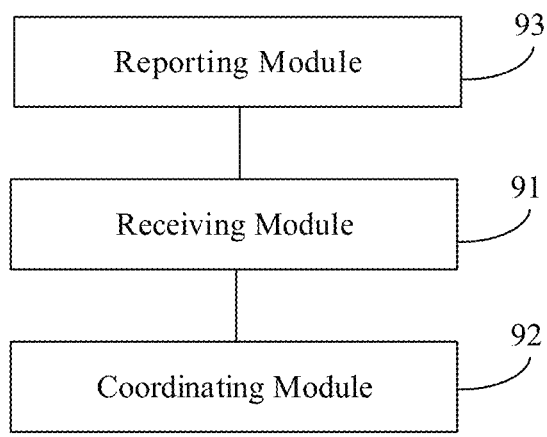
FIG. 10E is a block diagram illustrating yet another apparatus for coordinating interference according to an example.

FIG. 10E is a block diagram illustrating yet another apparatus for coordinating interference according to an example. As shown in FIG. 10E, based on the example shown in FIG. 9, the apparatus may further include a reporting module 93.

The reporting module 93 is configured to, before the receiving module 91 receives the configuration information sent by the base station, report interference tolerance capability information of the UE to the base station, so that the base station determines whether the in-device interference exists between the uplink and downlink transmissions in the two frequency bands according to the interference tolerance capability information and information on the UE accessing a network.

In the above example, by reporting interference tolerance capability information from the UE to the base station, the base station can determine whether the in-device interference, such as the harmonic interference or the intermodulation interference, exists between uplink and downlink transmissions in the two frequency bands by the UE according to the interference tolerance capability information and information on the UE accessing a network, thereby improving an accuracy for determining interference.

Figure 11:
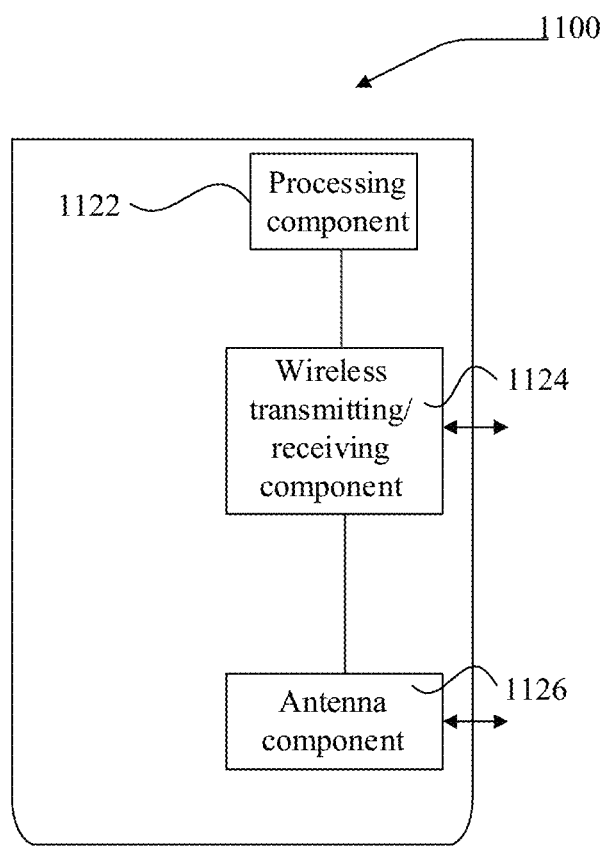
FIG. 11 is a block diagram illustrating an apparatus suitable for coordinating interference according to an example.

FIG. 11 is a block diagram illustrating an apparatus suitable for coordinating interference according to an example. An apparatus 1100 may be provided as a base station. Referring to FIG. 11, the apparatus 1100 includes a processing component 1122, a wireless transmitting/receiving component 1124, an antenna component 1126, and a signal processing portion dedicated to a wireless interface. The processing component 1122 may further include one or more processors.

One of the processors in the processing component 1122 may be configured to:

determine whether in-device interference exists between uplink and downlink transmissions, by UE, in two frequency bands; and when the in-device interference exists between the uplink and downlink transmissions in the two frequency bands by the UE, send configuration information to the UE, where the configuration information is used to instruct the UE to, in a time interval during which the base station sends control data of the downlink transmission in one of the two frequency bands, stop the uplink transmission in at least one of the two frequency bands or perform power back-off for the uplink transmission in the at least one of the two frequency bands.

Figure 12:
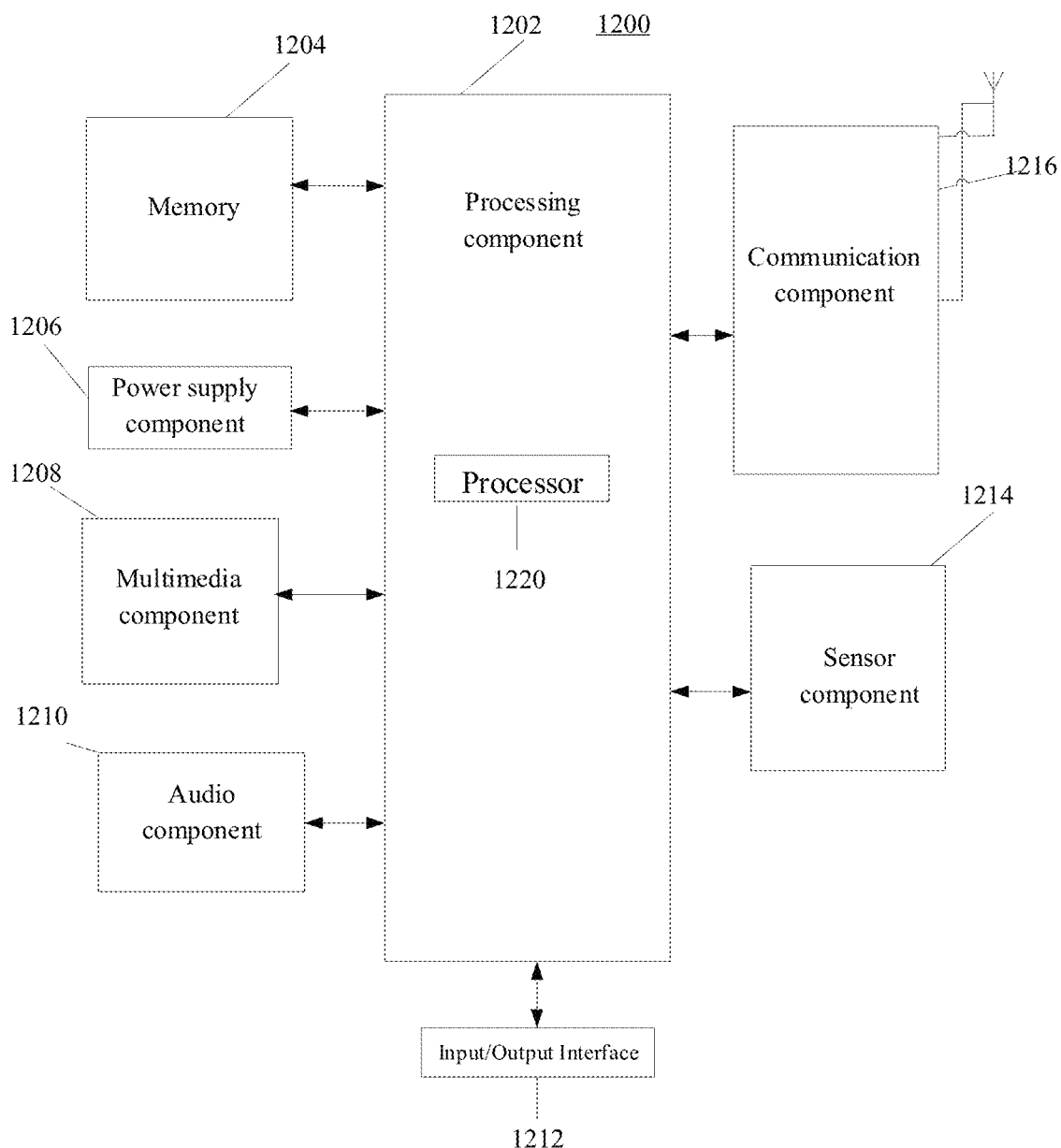
FIG. 12 is a block diagram illustrating another apparatus suitable for coordinating interference according to an example.

FIG. 12 is a block diagram illustrating another apparatus suitable for coordinating interference according to an example. For example, an apparatus 1200 may be UE, such as a mobile phone, a computer, a digital broadcast terminal, a message sending and receiving device, a game console, a tablet device, a medical device, a fitness device, a personal digital assistant, etc.

As shown in FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls overall operations of the apparatus 1200, such as operations associated with display, phone calls, data communications, camera operations, and recording operations. The processing component 1202 may include one or more processors 1209 to execute instructions to complete all or part of the steps of the above methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is to store various types of data to support the operation of the apparatus 1200. Examples of such data include instructions for any application or method operated on the apparatus 1200, contact data, telephone directory data, messages, pictures, videos and so on. The memory 1204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1206 supplies power for different components of the apparatus 1200. The power supply component 1206 may include a power supply management system, one or more power supplies, and other components associated with generating, managing and distributing power for the apparatus 1200.

The multimedia component 1208 includes a screen providing an output interface between the apparatus 1200 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1208 may include a front camera and/or a rear camera. The front camera and/or rear camera may receive external multimedia data when the apparatus 1200 is in an operating mode, such as a photographing mode or a video mode. Each of the front camera and the rear camera may be a fixed optical lens system or have focal length and optical zooming capability.

The audio component 1210 is to output and/or input an audio signal. For example, the audio component 1210 includes a microphone (MIC). When the apparatus 1200 is in an operating mode, such as a call mode, a record mode and a voice recognition mode, the microphone is to receive an external audio signal. The received audio signal may be further stored in the memory 1204 or sent via the communication component 1216. In some examples, the audio component 1210 further includes a speaker for outputting an audio signal.

The I/O interface 1212 provides an interface between the processing component 1202 and a peripheral interface module. The above peripheral interface module may be a keyboard, a click wheel, buttons, or the like. These buttons may include but not limited to, a home button, a volume button, a start button and a lock button.

The sensor component 1214 includes one or more sensors to provide status assessments of various aspects for the apparatus 1200. For example, the sensor component 1214 may detect the on/off status of the apparatus 1200, and relative positioning of component, for example, the component is a display and a keypad of the apparatus 1200. The sensor component 1214 may also detect a change in position of the apparatus 1200 or a component of the apparatus 1200, a presence or absence of the contact between a user and the apparatus 1200, an orientation or an acceleration/deceleration of the apparatus 1200, and a change in temperature of the apparatus 1200. The sensor component 1214 may include a proximity sensor to detect the presence of a nearby object without any physical contact. The sensor component 1214 may further include an optical sensor, such as a Complementary Metal-Oxide-Semiconductor (CMOS) or Charged Coupled Device (CCD) image sensor which is used in imaging applications. In some examples, the sensor component 1214 may further include an acceleration sensor, a gyroscope sensor, a magnetic sensor, a pressure sensor, or a temperature sensor.

The communication component 1216 is to facilitate wired or wireless communication between the apparatus 1200 and other devices. The apparatus 1200 may access a wireless network based on a communication standard, such as Wi-Fi, 2G or 3G, or a combination thereof. In an example, the communication component 1216 receives a broadcast signal or broadcast related information from an external broadcast management system via a broadcast channel. In an example, the communication component 1216 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In an example, the apparatus 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the method described above.

In an example, there is further provided a non-transitory computer-readable storage medium including instructions, such as the memory 1204 including instructions. The above instructions may be executed by the processor 1220 of the apparatus 1200 to complete the above method. For example, the non-transitory computer-readable storage medium may be a Read-Only Memory (ROM), a Random Access Memory (RAM), a CD-ROM, a magnetic tape, a floppy disk, an optical data storage device, and so on.

For the apparatus embodiment, since it basically corresponds to the method embodiment, reference may be made to the description of the part of the method embodiment. The apparatus embodiment described above are merely illustrative, where the units illustrated as separate components may or may not be physically separate, and the components displayed as units may or may not be physical units, that is may be located in one place or they can be distributed to multiple network elements. Some or all of the modules may be selected according to actual needs to achieve the objective of the solution of the embodiment. Those of ordinary skill in the art can understand and implement without any creative effort.

It should be noted that, as used herein, relational terms such as first and second are used merely to distinguish one entity or operation from another entity or operation, and do not necessarily require or imply there is any such actual relationship or order between these entities or operations. The terms "including", "comprising" or any other variant thereof are intended to include a non-exclusive inclusion, such that a process, a method, an article, or a device including a plurality of elements includes not only those elements but also other elements not specifically listed, or elements that are inherent to such a process, a method an article, or a device. An element defined by the phrase "comprising a . . . " without further limitation does not exclude the presence of additional identical elements in the process, method, article, or device that includes the element.

Other implementations of the present disclosure will be apparent to those skilled in the art from consideration of the specification and practice of the present disclosure herein. The present application is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of coordinating interference, comprising:
  receiving, by a base station, interference tolerance capability information reported by a User Equipment (UE); and then
  determining, by the base station, whether in-device interference exists between uplink and downlink transmissions, for the UE, in two frequency bands according to the interference tolerance capability information reported by the UE and information on the UE accessing a network, wherein the two frequency bands comprise a frequency band for Long Term Evolution (LTE) as a first frequency band and a frequency band for New Radio (NR) as a second frequency band;
  determining, by the base station, that a harmonic interference exists between an uplink transmission in the first frequency band and a downlink transmission in the second frequency band for the UE when integer multiples of the first frequency band at least partially overlap with the second frequency band;
  determining, by the base station, that an intermodulation interference exists between the uplink transmissions in both the first frequency band and the second frequency band and a downlink transmission in the first frequency band for the UE when the uplink transmission in the first frequency band and the uplink transmission in the second frequency band are added to a receiver at the same time to cause interference to the downlink transmission in the first frequency band or the second frequency band;
  determining, by the base station, a time interval during which the base station sends control data of the downlink transmission in one of the two frequency bands if the in-device interference exists between the uplink and downlink transmissions in the two frequency bands; and
  sending, by the base station, configuration information to the UE, wherein the configuration information is used to instruct the UE to, in the time interval during which the base station sends control data of the downlink transmission in one of the two frequency bands, stop the uplink transmission in at least one of the two frequency bands or perform power back-off for the uplink transmission in the at least one of the two frequency bands.

2. The method according to claim 1, wherein sending, by the base station, the configuration information to the UE, wherein the configuration information is used to instruct the UE to, in the time interval during which the base station sends the control data of the downlink transmission in one of the two frequency bands, stop the uplink transmission in the at least one of the two frequency bands or perform power back-off for the uplink transmission in the at least one of the two frequency bands, comprises:
  when it is determined that the harmonic interference exists between the uplink transmission in the first frequency band and the downlink transmission in the second frequency band for the UE, determining a first time interval during which the control data of the downlink transmission in the second frequency band is to be sent, and sending first configuration information to the UE, wherein the first configuration information is used to instruct the UE to, in the first time interval, stop the uplink transmission in the first frequency band or send the uplink transmission in the first frequency band at a reduced transmission power.

3. The method according to claim 1, wherein sending, by the base station, the configuration information to the UE, wherein the configuration information is used to instruct the UE to, in the time interval during which the base station sends the control data of the downlink transmission in one of the two frequency bands, stop the uplink transmission in the at least one of the two frequency bands or perform power back-off for the uplink transmission in the at least one of the two frequency bands, comprises:

when it is determined that the intermodulation interference exists between the uplink transmission in both the first frequency band and the second frequency band and the downlink transmission in the first frequency band for the UE, determining a second time interval during which the control data of the downlink transmission in the first frequency band is to be sent, and sending second configuration information and third configuration information to the UE, wherein the second configuration information is used to instruct the UE to, in the second time interval, stop the uplink transmission in the first frequency band or send the uplink transmission in the first frequency band at a reduced transmission power, and the third configuration information is used to instruct the UE to, in the second time interval, stop the uplink transmission in the second frequency band or send the uplink transmission in the second frequency band at the reduced transmission power.

4. The method according to claim 2, wherein the control data comprises control signaling and a reference signal, or the control data comprises the control signaling.

5. The method according to claim 4, wherein
when the control data comprises the control signaling only, the first configuration information comprises a first interference coordination policy, and the first interference coordination policy comprises: that the UE delays sending the uplink transmission in the first frequency band for a length of the first time interval, or a first set power value by which a transmission power is to be reduced.

6. A method of coordinating interference, comprising:
reporting, by a User equipment (UE), interference tolerance capability information of the UE to a base station for determining, for the UE, whether in-device interference exists between uplink and downlink transmissions in two frequency bands according to the interference tolerance capability information reported by the UE and information on the UE accessing a network, wherein the two frequency bands comprise a frequency band for Long Term Evolution (LTE) as a first frequency band and a frequency band for New Radio (NR) as a second frequency band; and then receiving, by the UE, configuration information, which is sent by the base station upon determining a time interval during which the base station sends control data of the downlink transmission in one of the two frequency bands after-if determining that the in-device interference exists between the uplink and downlink transmissions in the two frequency bands, wherein a harmonic interference exists between an uplink transmission in the first frequency band and a downlink transmission in the second frequency band for the UE when integer multiples of the first frequency band at least partially overlap with the second frequency band, or an intermodulation interference exists between the uplink transmissions in both the first frequency band and the second frequency band and a downlink transmission in the first frequency band for the UE when the uplink transmission in the first frequency band and the uplink transmission in the second frequency band are added to a receiver at the same time to cause interference to the downlink transmission in the first frequency band or the second frequency band; and according to the configuration information, in the time interval during which the base station sends control data of the downlink transmission in one of the two frequency bands, stopping, by the UE, the uplink transmission in at least one of the two frequency bands or performing, by the UE, power back-off for the uplink transmission in the at least one of the two frequency bands.

7. The method according to claim 6, wherein
the receiving, by the UE, the configuration information sent by the base station comprises: receiving first configuration information, which is sent by the base station upon determining that the harmonic interference exists between the uplink transmission in the first frequency band and the downlink transmission in the second frequency band for the UE and determining a first time interval during which the control data of the downlink transmission in the second frequency band is to be sent; and the according to the configuration information, in the time interval during which the base station sends the control data of the downlink transmission in one of the two frequency bands, stopping, by the UE, the uplink transmission in the at least one of the two frequency bands, or performing, by the UE, power back-off for the uplink transmission in the at least one of the two frequency bands comprises: according to the first configuration information, in the first time interval, stopping the uplink transmission in the first frequency band or sending the uplink transmission in the first frequency band at a reduced transmission power.

8. The method according to claim 6, wherein
the receiving, by the UE, the configuration information sent by the base station comprises: receiving second configuration information and third configuration information, which are sent by the base station upon determining that the intermodulation interference exists between the uplink transmission in both the first frequency band and the second frequency band and the downlink transmission in the first frequency band for the UE and determining a second time interval during which the control data of the downlink transmission in the first frequency band is to be sent; and the according to the configuration information, in the time interval during which the base station sends the control data of the downlink transmission in one of the two frequency bands, stopping, by the UE, the uplink transmission in the at least one of the two frequency bands, or performing, by the UE, power back-off for the uplink transmission in the at least one of the two frequency bands comprises: according to the second configuration information and the third configuration information, in the second time interval, stopping the uplink transmission in both the first frequency band and the second frequency band or sending the uplink transmission in both the first frequency band and the second frequency band at a reduced transmission power.

9. The method according to claim 7, wherein the control data comprises control signaling and a reference signal, or the control data comprises the control signaling.

10. The method according to claim 9, wherein
when the control data comprises the control signaling only, the first configuration information comprises a first interference coordination policy, and the first interference coordination policy comprises: that the UE delays sending the uplink transmission in the first frequency band for a length of the first time interval, or a first set power value by which a transmission power is to be reduced.

11. The method according to claim 10, wherein
the according to the first configuration information, in the first time interval, stopping the uplink transmission in the first frequency band comprises: according to the first interference coordination policy, delaying sending the uplink transmission in the first frequency band for at least the length of the first time interval; or
the sending the uplink transmission in the first frequency band at the reduced transmission power comprises: sending the uplink transmission in the first frequency band at a transmission power reduced by the first set power value.

12. A base station comprises:
a processor; and
a memory for storing instructions executable by the processor,
wherein the processor is configured to:
 receive interference tolerance capability information reported by a User Equipment (UE); and then
 determine whether in-device interference exists between uplink and downlink transmissions, for the UE, in two frequency bands according to the interference tolerance capability information reported by the UE and information on the UE accessing a network, wherein the two frequency bands comprise a frequency band for Long Term Evolution (LTE) as a first frequency band and a frequency band for New Radio (NR) as a second frequency band;
 determine that a harmonic interference exists between an uplink transmission in the first frequency band and a downlink transmission in the second frequency band for the UE when integer multiples of the first frequency band at least partially overlap with the second frequency band;
 determine that an intermodulation interference exists between the uplink transmissions in both the first frequency band and the second frequency band and a downlink transmission in the first frequency band for the UE when the uplink transmission in the first frequency band and the uplink transmission in the second frequency band are added to a receiver at the same time to cause interference to the downlink transmission in the first frequency band or the second frequency band;
 determine a time interval during which the base station sends control data of the downlink transmission in one of the two frequency bands if the in-device interference exists between the uplink and downlink transmissions in the two frequency bands; and
 send configuration information to the UE, wherein the configuration information is used to instruct the UE to, in the time interval during which the base station sends control data of the downlink transmission in one of the two frequency bands, stop the uplink transmission in at least one of the two frequency bands or perform power back-off for the uplink transmission in the at least one of the two frequency bands.

13. The method according to claim 8, wherein the control data comprise control signaling and a reference signal, or the control data comprise the control signaling.

14. The method according to claim 13, wherein
when the control data comprises the control signaling only, each of the second configuration information and the third configuration information comprises a second interference coordination policy, and the second interference coordination policy comprises: the UE delays sending the uplink transmission in both the first frequency band and the second frequency band for a length of the second time interval, or a second set power value by which a transmission power is to be reduced.

15. The method according to claim 14, wherein
the according to the second configuration information and the third configuration information, in the second time interval, stopping the uplink transmission in both the first frequency band and the second frequency band comprises: according to the second interference coordination policy, delaying sending the uplink transmission in both the first frequency band and the second frequency band for at least the length of the second time interval; or
the sending the uplink transmission in both the first frequency band and the second frequency band at the reduced transmission power comprises: sending the uplink transmission in both the first frequency band and the second frequency band at a transmission power reduced by the second set power value.

* * * * *